United States Patent [19]
Ott

[11] 3,723,432
[45] Mar. 27, 1973

[54] 1-SUBSTITUTED-4-ARYL-2(1H)-QUINAZOLINONES AND THEIR PREPARATION

[75] Inventor: Hans Ott, Pfeffingen, Basel-Land, Switzerland

[73] Assignee: Sandoz-Wander, Inc., Hanover, N.J.

[22] Filed: Nov. 12, 1968

[21] Appl. No.: 775,201

Related U.S. Application Data

[63] Continuation-in-part of Ser. No. 741,804, July 1, 1968, abandoned, which is a continuation-in-part of Ser. No. 707,932, Feb. 26, 1968, abandoned, which is a continuation-in-part of Ser. No. 672,739, Oct. 4, 1967, abandoned, which is a continuation-in-part of Ser. No. 636,015, May 4, 1967, abandoned, which is a continuation-in-part of Ser. No. 575,511, Aug. 29, 1966, abandoned.

[52] U.S. Cl...260/251 QB, 260/251 Q, 260/256.4 Q, 260/556 R, 260/256.5 R, 424/251
[51] Int. Cl. ...........................................C07d 51/48
[58] Field of Search ........260/251 Q, 256.4 Q, 256.5

[56] References Cited

UNITED STATES PATENTS 3,452,041  6/1969  Bell et al. ..........................260/309.5

*Primary Examiner*—Alex Mazel
*Assistant Examiner*—R. V. Rush
*Attorney*—Gerald D. Sharkin, Richard E. Vila, Robert S. Honor, Frederick H. Weinfeldt and Walter F. Jewell

[57] ABSTRACT

Compounds are of the class of 1-substituted-4-aryl-2(1H)-quinazolinones, e.g., 1-ethyl-4-phenyl-2(1H)-quinazolinone, which are useful as anti-inflammatory agents, antipyretics and analgesics. The compounds are prepared by any one of several processes including, inter alia, the cyclization of a 2-alkylaminobenzophenone with urethane, the cyclization of a 2-alkylaminobenzophenonimine with phosgene, the reaction of a 1-alkali metal salt of a 4-aryl-2(1H)-quinazolinone with an alkyl halide or from a 1-unsubstituted-4-arylquinazoline which is reacted with a methyl halide to form the corresponding 1-methylquinazolinium halide which is either then directly oxidized or first reduced and then oxidized to obtain the 1-methyl-4-aryl-2(1H)-quinazolinone. Novel intermediates disclosed include the 1-methyl-4-aryl-quinazoliniums and compounds which are 1-methyl-4-aryl-3,4-dihydroquinazolines.

70 Claims, No Drawings

1-SUBSTITUTED-4-ARYL-2(1H)-QUINAZOLINONES AND THEIR PREPARATION

This application is a continuation-in-part of my copending application Ser. No. 741,804, filed July 1, 1968, which is a continuation-in-part of application Ser. No. 707,932, filed Feb. 26, 1968, which is a continuation-in-part of application Ser. No. 672,739, filed Oct. 4, 1967, which is a continuation-in-part of application Ser. No. 636,015, filed May 4, 1967, which is a continuation-in-part of my copending application Ser. No. 575,511, filed Aug. 29, 1966, now all abandoned.

This invention relates to bicyclic compounds. In particular, the invention pertains to 1-substituted-2(1H)-quinazolinones and methods of preparing the same. The invention also relates to intermediates which are useful in the preparation of the above compounds and to processes for preparing said intermediates.

The chemical compound which is 4-phenyl-2(1H)-quinazolinone has been known for some time and described in the literature, e.g., see Gabriel and Stelzney, Chem. Berichte 29, 1300 (1896) and Schofield, J. Chem. Soc. (London) 1952, 1927. No pharmacological activity has been associated with said 4-phenyl-2(1H)-quinazolinone.

The quinazolinones of the present invention may be represented structurally as follows:

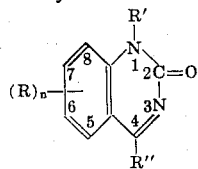

I wherein R represents hydrogen; halo, preferably having an atomic weight no greater than 80, i.e. fluoro, bromo and chloro; lower alkyl, preferably containing one to three carbon atoms; lower alkoxy, preferably containing one to two carbon atoms; hydroxy; nitro; amino; cyano; acetamido; trifluoromethyl; mercapto; lower alkylthio where the alkyl is of one to two carbon atoms; lower alkylamino of one to four carbon atoms; or di(lower)alkylamino where each alkyl is of one to four carbon atoms;

$n$ is 1 or 2, and when 2 then: A) one and the other R is, independently, halo, lower alkyl or lower alkoxy, or the other R is one of nitro, amino, N-alkylamino and dialkylamino; or B) one R is N-alkylamino or dialkylamino while the other R is nitro;

R' represents lower alkyl, preferably containing from one to five carbon atoms, e.g., methyl, ethyl, propyl, isopropyl, butyl, sec-butyl and isobutyl; allyl, methallyl; or propargyl; provided R' is not an unsaturated hydrocarbon substituent when R° is N-alkylamino;

R'' represents phenyl; or substituted phenyl of the formula

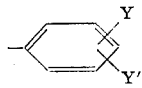

Y represents halo, hydroxy, lower alkyl, preferably containing from one to three carbon atoms, e.g., methyl, ethyl, propyl and butyl, lower alkoxy, preferably containing from one to two carbon atoms, e.g., methoxy, ethoxy, propoxy and butoxy; or trifluoromethyl; and Y' represents hydrogen, halo, hydroxy, lower alkyl, preferably containing from one to three carbon atoms, e.g., methyl, ethyl, propyl and butyl, or lower alkoxy preferably containing from one to two carbon atoms, e.g., methoxy, ethoxy, propoxy and butoxy;

or a pharmaceutically acceptable acid addition salt thereof.

In the preferred method for preparing the compounds of structural formula I, an appropriately substituted o-aminobenzophenone is cyclized by reacting with ethyl carbamate in the presence of a suitable Lewis acid, e.g., zinc chloride. Another preferred method involves cyclizing an appropriately substituted o-aminobenzophenonimine, preferably by reaction with phosgene. Alternatively, the compounds of formula I may be prepared by reacting an alkali metal salt of an appropriately substituted quinazolinone with an appropriate halide (R'X). Those compounds of formula I wherein R' is limited to methyl (and R and R'' are as defined) may also be prepared by reacting an appropriately substituted quinazoline with a methyl halide to form the corresponding 1-methyl halide salt thereof and then either oxidizing the latter to form the desired quinazolinone or first reducing the halide salt to form the corresponding 1,2,3,4-tetrahydroquinazoline and then oxidizing the latter to form the quinazolinone. These processes may be illustrated, as follows:

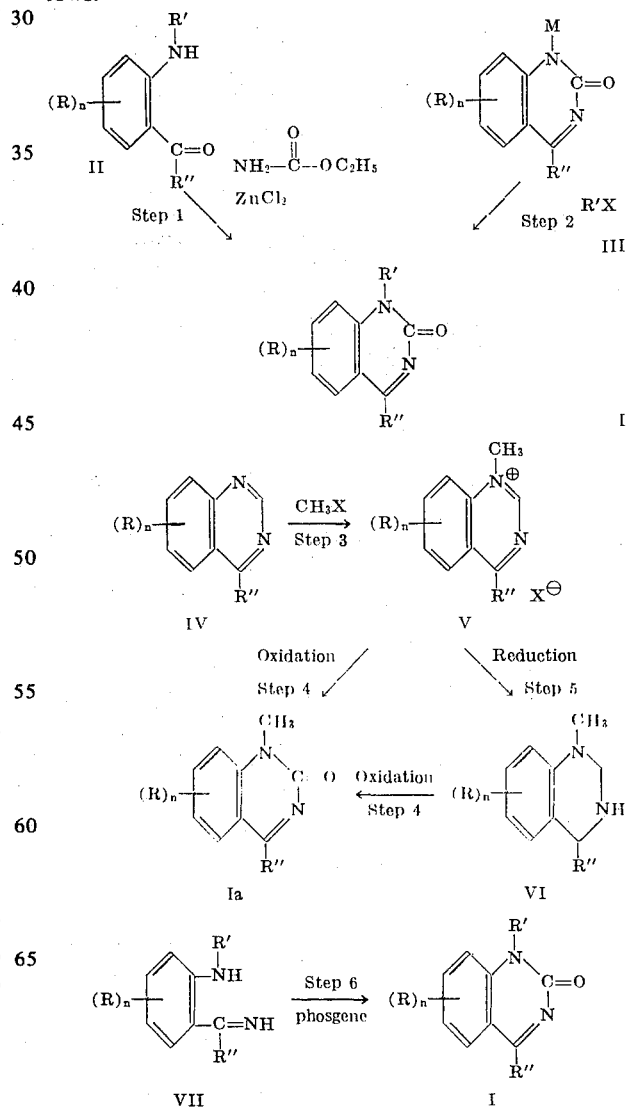

wherein R, n, R' and R'' are as defined above, M represents an alkali metal, preferably sodium or potassium, and X represents halogen, preferably iodo.

Step 1 of the above-illustrated processes is conveniently carried out at elevated temperatures and in the presence of a catalytic amount of zinc chloride. Preferably, the reaction is effected at a temperature of from about 160° C. to about 200° C. If desired, the reaction may be carried out in the presence of a suitable inert organic solvent. However, the use of a solvent is not necessary since an excess of the carbamate can be used for this purpose. Depending upon the particular conditions employed the reaction time will generally vary from about 30 minutes to about 2 hours.

The conversion of the 1-metallo quinazolinone (III) to the desired quinazolinone (I), as illustrated by Step 2, is conveniently carried out at room temperature (20° C.) or at elevated temperatures of up to about 100° C. Desirably, the reaction of the salt with the appropriate halide, preferably the iodide, is carried out in the same solvent employed to prepare the 1-metallo derivative (III). The preparation of the latter is readily carried out by treating the corresponding 1-unsubstituted quinazolinone in conventional manner, with any of the conventional agents commonly employed for preparing alkali metal salts, e.g., sodium hydride and the alkali metal alkoxides such as sodium methoxide, sodium ethoxide, potassium methoxide and potassium ethoxide. The formation of the salt, preferably the sodium or potassium salt, is conveniently carried out in a suitable inert organic solvent, e.g., dimethylacetamide, diethylacetamide, dimethylformamide, dimethylsulfoxide and dioxane, and at room temperature.

The reaction of the quinazoline (IV) with the methyl halide (Step 3) is carried out at room temperature (20° C.) or elevated temperatures of up to about 45° C. employing either an excess of the halide reactant or a suitable inert organic solvent as the reaction medium. Preferably, the reaction is initially carried out at room temperature and then continued at reflux temperature employing an excess of methyl iodide as the halide reactant. If it is desired to employ a solvent rather than an excess of the halide reactant, any inert organic solvent commonly employed for carrying out reactions of this nature, e.g., chloroform and acetone, can be employed. When the halide employed is a gas at ordinary room temperature, a suitable inert organic solvent is generally employed as the reaction medium.

The conversion of the quinazolinium halide (V) to the corresponding tetrahydroquinazoline (VI), as illustrated by Step 5, can be achieved by chemical reduction employing a suitable borohydride, e.g., sodium borohydride, as the reducing agent. The reduction is conveniently effected in a suitable organic solvent, e.g., a lower alkanol such as methanol or ethanol, and mixtures of lower alkanols with methylene chloride, chloroform or water. The reaction temperature is desirably in the range of from about room temperature (20° C.) to about 80° C.

The oxidation (Step 4) of the quinazolinium halide (V) or tetrahydroquinazoline (VI) is readily effected in the presence of any suitable inert organic solvent, e.g., dioxane and acetone, at room temperature employing sodium permanganate or potassium permanganate as the oxidizing agent.

In each of the steps discussed above, the product obtained can be readily recovered employing conventional techniques. However, it should be noted that the products obtained from Step 5 are somewhat unstable and therefore it is generally desirable to convert the same to the desired quinazolinone (Ia), as described hereinabove, as soon as possible.

The production of compounds of formula I by Step 6 involving the reaction of an o-benzophenonimine of formula VII with phosgene may be carried out at temperatures in the range of 0° C. to 50° C., preferably 10° C. to 30° C. The reaction of Step 6 is desirably carried out in an inert organic solvent which may be any of the several convenient for the purpose, preferably an aromatic hydrocarbon, e.g., benzene, toluene, and xylene, more preferably benzene. The mole ratio of phosgene to compound VII is not particularly important and a substantial excess of phosgene is employed in the preferred forms of practice to obtain more efficient reaction rates. The compounds of formula I may be obtained from the reaction mixture of Step 6 by working up in a conventional manner. Preparation of the compounds of formula I in which R' represents an alkyl substituent having a tertiary carbon atom attached to the ring nitrogen is not well-suited to the other above-illustrated processes but such compounds have been found to be readily produced by cyclizing an appropriately substituted o-tert. butyl-benzophenonimine of formula VII with phosgene in accordance with the procedure of Step 6.

Certain of the compounds I of the invention may also be employed to produce other compounds I of the invention. For example, those compounds of formula I wherein R' is as defined, and one or more of R, Y and Y' is hydroxy or mercapto, are usually most desirably prepared from the corresponding alkoxy and alkylthio derivatives, respectively, by hydrolyzing such derivatives under acidic conditions. The hydrolysis is carried out in conventional manner employing the usual conditions generally utilized for converting an alkoxy or alkylthio group respectively to a hydroxy or mercapto group, e.g., by treatment of said derivative with aqueous hydrobromic acid or hydrobromic acid in acetic acid.

Additionally, compounds of formula I in which R is nitro may be produced by direct nitration of other compounds as illustrated herein in Example 49. Also, compounds I in which R is nitro or amino may be employed in producing other compounds of formula I such as those in which R is halo, amino, acetamido, cyano, hydroxy, mercapto, N-alkylamino and dialkylamino. The conversion of compounds I in which R is nitro or amino to other compounds I may be carried out by one or more of several generally known procedures and in most situations represents the preferred manner of preparing compounds of formula I in which R is amino, cyano, acetamido and various compounds I in which R is N-alkylamino or dialkylamino. It is thus possible to produce compounds I in which R is amino from corresponding compounds I in which R is nitro employing a suitable elemental metal reducing agent such as iron, and an acidic reaction medium, as illustrated in Example 25. The compounds I in which R is amino may be also converted by the well-known Sandmeyer reaction to various compounds I, as illustrated by Examples 27 and 28. The Sandmeyer reaction is usually preferred in producing compounds I in which R is cyano, but may also be applied to other significances of R such as halo, particularly bromo, hydroxy, mercapto, alkoxy or alkylthio. The compounds I in which R is amino are also useful in producing the corresponding acetamido derivative by reaction with acetic anhydride in a suitable solvent such as pyridine, as illustrated by Example 26.

The preparation of compounds of formula I in which R is N-alkylamino or dialkylamino is preferably carried out by the above-indicated reactions of Step 1 or Step 6 or by reacting a compound I in which R is nitro or amino according to the procedures illustrated as follows:

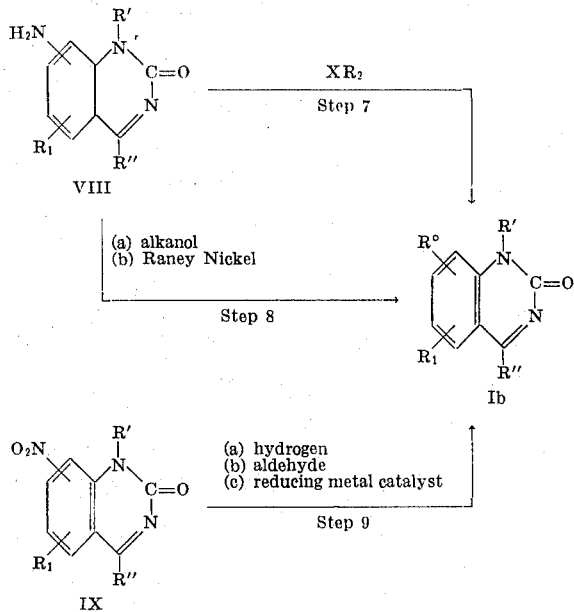

wherein R', R'' and X are as defined above, R° is N-alkylamino or dialkylamino, $R_1$ is hydrogen, halo, lower alkoxy or lower alkyl, and $R_2$ is alkyl of one to four carbon atoms.

The preparation of compounds Ib by Step 7 involving reaction of a compound VIII with an alkyl halide is an alkylation reaction of known type conveniently carried out in an organic solvent at temperatures in the range of from 20° C. to 150° C., usually 50° C. to 100° C. The reaction is desirably carried out in the presence of a base of which the inorganic bases, particularly an alkali metal carbonate, e.g., sodium carbonate, are preferred. In most situations the alkyl halide may be conveniently employed in excess as solvent for the reaction. Other well known organic solvents may be also employed. Representative of the more suitable conventional solvents are dioxane, benzene and toluene. The reaction of Step 7 may be varied to produce compounds of formula IA in which the benzene ring portion of the quinazolinone is substituted by either N-alkylamino or dialkylamino. In general, the shorter reaction periods are employed when producing the N-alkylamino derivatives. The longer reaction times and higher temperatures are conditions favoring the production of the dialkylamino derivatives. Techniques conveniently employed in the alkyl halide alkylation of amines may be also employed to advantage in preparation of the compounds of invention by Step 7. For example, it is within the scope of Step 7 to tosylate the amino group of the compound VIII prior to alkylation followed by detosylation after alkylation in producing compounds in which R° represents a N-(lower)alkyl substituent. The product compound Ib may be isolated from the reaction mixture of Step 7 by working up in a known manner.

The preparation of compounds Ib by Step 8 involves reaction of a compound VIII with a lower alkanol of two to four carbon atoms in the presence of Raney Nickel and is a reductive alkylation of known type. The reaction is conveniently carried out in an organic solvent at temperatures in the range of from 30° C. to 150° C., preferably 50° C. to 100° C. While any of several conventional organic solvents may be employed, it is convenient and generally preferred to employ an excess of the lower alkanol as solvent. Examples of other more suitable conventional solvents include dioxane and ethyl acetate. The reaction of Step 8 is especially useful in producing compounds of formula IA having an N-alkylamino substituent of two to four carbon atoms and for this purpose the shorter reaction periods in the range of about 30 minutes to about 5 hours are usually satisfactory. The use of an excess of Raney Nickel has been found to assist in the preparation of the N-alkylamino derivatives. The product compound Ib may be isolated from the reaction mixture by working up in a conventional manner.

Preparation of compounds Ib by Step 9 involving reaction of a compound IX with hydrogen and a lower aldehyde in the presence of a reducing metal catalyst is a reductive alkylation of known type. The reaction may be conveniently carried out in an organic solvent at elevated pressures and at temperatures in the range of 10° C. to 80° C., typically at about room temperature. Pressures of from 1 to 5 atmospheres above normal atmospheric pressure are suitably employed. The solvent preferably employed in methanol or the alkanol corresponding in carbon atoms to the aldehyde. However, other solvents of conventional type may be used, for example, dioxane and ethyl acetate. The reducing metal catalyst desirably employed is Raney Nickel although other reducing metal catalysts such as platinum may be used to advantage in certain situations. Step 9 is especially applicable to production of compounds of formula Ib in which the alkylamino substituent is dialkylamino, particularly, dimethylamino, although compounds Ib having an N-alkylamino substituent may be also obtained when carrying out the reaction with the amount of aldehyde limited to about the stoichiometric amount for the reaction. The product compound Ib may be isolated from the reaction of Step 9 by working up in a conventional manner.

Others methods may be employed for preparation of the compounds Ib, and such procedure also includes those in which a compound I or Ib is the starting material. For example, compounds Ib in which R is dialkylamino may be prepared from a corresponding N-alkylamino derivative by reaction with appropriate alkyl halide, as illustrated in Example 55. Certain more specific compounds of formula Ib may be also prepared by subjecting a compound I having a suitably activated chloro substituent to reaction with an alkylamine in presence of a catalyst according to established procedure.

It will be evident that in general the particularly preferred procedure for preparation of a compound of formula I, and in particular those in which R is an alkylamino, will vary depending on one or more of several known factors including the particular compound desired, availability of starting materials and apparatus, costs and the like. In the usual case, the above-described Steps 7, 8 and 9 are preferred for preparation of compounds Ib in which the alkylamino substituent is N-alkylamino or to be placed at the 6-position of the quinazolinone product. Steps 1 and 6 are more suitable for preparation of compounds Ib having a dialkylamino substituent and are usually preferred for preparation of compounds in which the alkylamino substituent is to be placed at other than the 6-position.

For the preparation of those compounds of formula I wherein R' represents a branched alkyl substituent and the branching occurs on the carbon atom directly attached to the ring nitrogen atom, e.g., isopropyl and sec-butyl, it is most advantageous to employ the process of Step 1 or Step 6 since said processes afford better yields of the desired product.

Various of the quinazolines employed as starting materials in Step 3 are known and can be prepared as described in the literature [see, e.g., J. Chem. Soc., 1927 (1952)]. Such others which are not specifically disclosed may be prepared from available materials in analogous manner or by other known procedures.

Alternatively, the quinazolines (IV) may be prepared by oxidizing the corresponding 3,4-dihydroquinazolines which in turn are prepared by reacting quinazoline (or substituted quinazoline) with either an arylmagnesium halide or an aryl lithium compound. These processes are illustrated below:

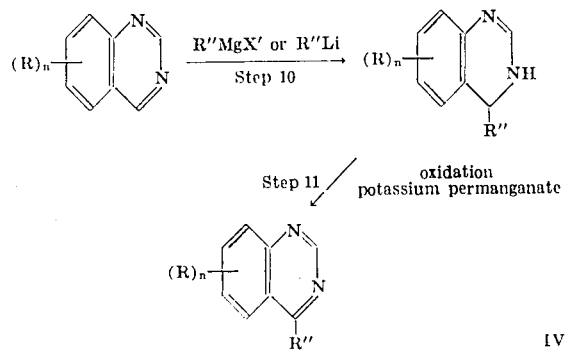

wherein R, R" and n may be as defined above and X' represents chloro or bromo. It is, however, usually desirable to apply the oxidation Step 11 as well as the oxidation Step 4 previously illustrated to situations in which R is other than amino, alkylamino, alkylthio, hydroxy, mercapto, cyano and alkylamino. The reaction of the quinazoline with either the aryl-magnesium halide or aryl lithium compound is carried out in conventional manner and the quinazolines, aryl lithium compounds and Grignard reagents employed in the reaction are either known or can be readily prepared from available materials by established procedure known to those skilled in the art. Oxidation of the 3,4-dihydro-quinazoline is readily effected in an inert organic solvent (dioxane) and at room temperature.

Similarly, various of the quinazolinones used as starting materials for the preparation of the 1-metallo derivatives (III) are known and can be prepared as described in the literature, for example, by reaction of the appropriately substituted 2-aminobenzophenone with urea at temperatures preferably between 160°–200° C., followed by crystallization from a suitable solvent, e.g., ethanol, as disclosed in Jap. Pat. 20865/65 published 9/16/63, and illustrated in Examples 29, 31 and 35. Such others which are not specifically disclosed may be prepared from available materials in analogous manner. Such quinazolinones can be also prepared from the appropriately substituted 2-aminobenzophenones by the reaction of Step 1, as illustrated in Example 17.

The o-aminobenzophenones which are compounds II and employed in Step 1 are likewise either known or can be prepared from available materials by procedures known in the art. In situations where R is 5-nitro-or 5-trifluoromethyl in compounds II, it is preferred to prepare such compounds by reaction of the corresponding 5-R (nitro or trifluoromethyl)-2-chloro-benzophenone with an appropriate amine (R'NH$_2$) in the presence of a suitable catalyst, such as a mixture of copper and cuprous chloride, as demonstrated in Examples 22 – 24, inclusive.

The o-aminobenzophenonimines of formula VII employed as starting material in Step 6 also are know or can be prepared from available materials by one or more of a number of well-established procedures, as will be evident to those skilled in the art. In general, the compounds of formula VII may be produced by reaction of a corresponding o-aminobenzophenone of formula II with ammonia, desirably in a sealed reactor under anhydrous conditions and at elevated temperatures and pressures. Reaction temperatures are suitably in the range of 100° C. to 200° C., preferably 110° C. to 150° C. A catalyst such as a Lewis acid, e.g., zinc chloride, may be employed to advantage in the process. The reaction is preferably carried out with ammonia as solvent, or with a suitable co-solvent, e.g., dioxane, followed by recovery in a conventional manner. Another well-known procedure for producing compounds VII involves the tosylation, alkylation and detosylation of an appropriately substituted anthranilonitrile to obtain the corresponding 2-aminobenzonitrile which is then reacted with a phenyl Grignard compound or phenyllithium compound, followed by working up in a known manner to obtain the compound of formula VII.

The o-aminobenzophenones of formula II and the o-aminobenzophenonimines of formula VII in which R' is a branched alkyl substituent in which the branching occurs on the carbon atom attached to the amino nitrogen, e.g., isopropyl, are in most situations conveniently and preferably prepared by direct alkylation of a corresponding 2-amino starting material with an alkyl halide as illustrated herein in Example 37.

Certain compounds of formula I, in particular, those in which R is nitrogen-containing, will form acid addition salts and those pharmaceutically acceptable salts not materially affecting the pharmacological properties of the compounds of formula I are also included within the scope of the invention. Such salts include the acid addition salts, e.g., the hydrochloride, fumarate, formate, acetate, citrate, sulfonate, malonate, tartrate, methane sulfonate, salicylate and hydrosulfate. The acid addition salts may be produced as desired from the corresponding free bases by conventional procedures. Conversely, the free bases may be obtained from the salts or by procedures known in the art.

The compounds of structural formula I are useful because they possess pharmacological activity in animals. In particular, the compounds are useful as anti-inflammatory agents as indicated by the Carrageenan-induced edema test on rats (oral administration). For such use, the compounds may be combined with a pharmaceutically acceptable carrier, and such other conventional adjuvants as may be necessary, and administered orally in such forms as tablets, capsules, elixirs, suspensions and the like or parenterally in the form of an injectable solution or suspension. The dosage administered will, of course, vary depending upon the compounds used and the mode of administration. However, in general, satisfactory results are obtained when administered at a daily dosage of from about .15 milligram to about 100 milligrams per kilogram of body weight, preferably given in divided doses 2 to 4 times a day, or in a sustained release form. For most mammals the administration of from about 10 milligrams to about 1000 milligrams of the compound per day provides satisfactory results and dosage forms suitable for internal administration comprise from about 3 milligrams to about 500 milligrams of the compound in admixture with a solid or liquid pharmaceutical carrier or diluent.

The compounds I of the invention are also useful as analgesics as indicated by application of pressure to yeast-inflamed foot of the rat (oral administration). They are also useful as anti-pyretics as indicated by inhibition of bacterial lipopolysaccharides-induced fever (oral administration). For such uses, the compound may be administered to obtain satisfactory results at dosages and in modes similar to those employed in the treatment of inflammation.

A representative formulation is a tablet prepared by conventional tabletting techniques and containing the following ingredients:

| Ingredient | Parts by Weight |
|---|---|
| 1-Isopropyl-7-methyl-4-phenyl-2 (1H)-quinazolinone | 50 |
| Tragacanth | 2 |
| Lactose | 39.5 |
| Corn Starch | 5 |
| Talcum | 3 |
| Magnesium Stearate | 0.5 |

From the standpoint of anti-inflammatory activity based on the above-mentioned tests, the compounds I of general preference are those in which R' is methyl, ethyl, isopropyl, tertiary butyl, allyl and propargyl, more preferably, ethyl, isopropyl and tertiary butyl, and especially isopropyl, R'' is preferably unsubstituted phenyl in most situations. The very good anti-inflammatory activity of compounds in which R' is, for example, ethyl or isopropyl may be discernibly and even sharply increased in certain situations in which R is other than hydrogen, the R substituents of interest in this connection usually being methyl, ethyl, chloro or an alkylamino such as dialkylamino. One may specifically mention, for example, the unexpected and remarkable anti-inflammatory activity demonstrated by 7-methyl-1-isopropyl-4-phenyl-2(1H)-quinazolinone compared, for example, with the already very good 6-methyl-1-isopropyl-4-phenyl-2(1H)-quinazolinone. As is often the case with compounds exhibiting anti-inflammatory and analgesic activity, compounds I within the scope of the invention also exhibit anti-bradykinin activity as demonstrated on intravenous administration to the guinea pig, for example, in doses of 4.0 to 5000 micrograms per kilogram of body weight. Thus, one might also mention the compound 1-isopropyl-4-phenyl-2(1H)-quinazolinone because of its unusually high anti-bradykinin activity and uses of interest based on such activity such as the treatment of atheroschlerosis as described by P. Shimamoto et al., Asian Medical J. 8, 825 (1965) and P. Shimamoto et al., Am. Heart J. 71, 216 (1966).

In addition, it has been found that compounds of formula I in which R is N-alkylamino or dialkylamino may be also used as hypotensive agents, as indicated by a lowering of blood pressure on intravenous administration to the anesthetized dog (10–20 mg./kg. dosage). For such use the dosage will vary depending upon the compound used, mode of administration and the like. However, in general, satisfactory results are obtained when administered at a daily dosage of from about 1 to 20 milligrams per kilogram of body weight. For most mammals, the administration of from about 50 to about 400 milligrams of the compound per day is satisfactory and dosage forms suitable for internal administration comprise from about 12 to 200 milligrams in admixture with a solid or liquid pharmaceutical carrier or diluent. Modes and forms of administration are similar for those used in treatment of inflammation.

The following examples show representative compounds encompassed within the scope of this invention and the manner in which such compounds are prepared. However, it is to be understood that the examples are for purposes of illustration only.

EXAMPLE 1

1-Methyl-4-phenyl-2(1H)-quinazolinone

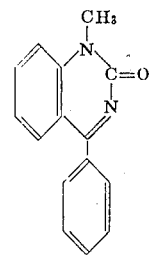

Step A. Preparation of 1-methyl-4-phenyl-quinazolinium iodide

A solution of 2.0 g. of 4-phenylquinazoline in 10 ml. of methyl iodide is kept at room temperature overnight and then refluxed for 8 hours. The resulting mixture is then cooled, and the crystalline material thus obtained is filtered off and washed with diethyl ether to obtain 1-methyl-4-phenyl-quinazolinium iodide, m.p. 200°–201° C.

Step B. Preparation of 1-methyl-4-phenyl-2(1H)-quinazolinone.

To a suspension of 5.7 g. of 1-methyl-4-phenyl-quinazolinium iodide in 300 ml. of purified dioxane is added slowly a solution of 4 g. of potassium permanganate in 150 ml. of water. The reaction mixture is maintained at room temperature for 15 minutes and then 10 ml. of commercial dioxane and 25 ml. of 1% aqueous solution of sodium thiosulfate are added to destroy the excess permanganate and reduce any iodine which is formed. The resulting mixture is then filtered and the filtrate concentrated to about 100 ml. in vacuo. To the resultant is added 80 ml. of methylene chloride and 80 ml. of water. The organic phase is separated, washed first with 50 ml. of aqueous (2 percent) sodium carbonate solution and then with 40 ml. of water and then dried over sodium sulfate and evaporated in vacuo. The residue is dissolved in 10 ml. of ethyl acetate. To the resulting solution is added 8 ml. of diethyl ether and the resulting crystalline material filtered off to obtain 1-methyl-4-phenyl-2(1H)-quinazolinone, m.p. 142°–143° C.

EXAMPLE 2

1-Methyl-4-phenyl-2(1H)-quinazolinone (via Step 5)

Step A. Preparation of 1-methyl-4-phenyl-1,2,3,4-tetrahydroquinazoline

To a solution of 18 g. of 1-methyl-4-phenyl-quinazolinium iodide in 500 ml. of absolute ethanol and 250 ml. of methylene chloride is added, in small portions and at room temperature, 6 g. of sodium borohydride. After 45 minutes, 3 ml. of acetic acid is added to destroy the excess sodium borohydride. The solvents are then evaporated off in vacuo, and the residue treated with 180 ml. of methylene chloride and 10 ml. of aqueous 5N sodium hydroxide solution. The organic phase is then separated, washed with 250 ml. of water, dried over sodium sulfate and then evaporated to obtain 1-methyl-4-phenyl-1,2,3,4-tetrahydroquinazoline as an oil.

Step B. Preparation of 1-methyl-4-phenyl-2(1H)-quinazolinone

To a solution of 12 g. of 1-methyl-4-phenyl-1,2,3,4-tetrahydroquinazoline in 500 ml. of purified dioxane is slowly added a solution of 13.2 g. of potassium permanganate in 250 ml. of water. After the addition is completed the reaction mixture is kept at room temperature for 10 minutes and then 25 ml. of commercial dioxane is added to destroy the excess permanganate. The resulting mixture is then filtered, and the filtrate concentrated to about 100 ml. in vacuo. To the resultant is added 120 ml. of methylene chloride and 150 ml. of water. The organic phase is separated, washed first with 150 ml. of aqueous (2 percent) sodium carbonate solution, then with 100 ml. of water and then dried over sodium sulfate and evaporated in vacuo. The residue is dissolved in 30 ml. of ethyl acetate. To the resulting solution is added 15 ml. of diethyl ether, and the crystalline material thus obtained filtered off to obtain 1-methyl-4-phenyl-2(1H)-quinazolinone, m.p. 142°–143°C.

EXAMPLE 3

1-Methyl-4-phenyl-2(1H)-quinazolinone (via Step 1)

A mixture of 1.0 g. of o-methylaminobenzophenone, 2.0 g. of urethane and 20 mg. of zinc chloride is heated for 1 ¼ hours at 180°–190°C. (oil bath). The resulting mixture is cooled to room temperature and the resulting solid material treated with 100 ml. of a 1:1 mixture of methylene chloride and water. The organic phase is separated, dried over anhydrous sodium sulfate, filtered and the solvent evaporated off. The residue is crystallized from ethyl acetate to obtain 1-methyl-4-phenyl-2(1H)-quinazolinone, m.p. 141°–143°C.

EXAMPLE 4

1-Ethyl-4-phenyl-2(1H)-quinazolinone (via Step 2)

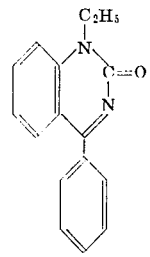

To a solution of 2.2 g. of 4-phenyl-2(1H)-quinazolinone in 50 ml. of dimethylacetamide is added, at room temperature, 0.75 g. of sodium hydride (50 percent in mineral oil). The resulting mixture is stirred for 15 minutes at room temperature and then 4 ml. of ethyl iodide is added. The mixture is stirred for an additional 30 minutes at room temperature and then heated at 60°C. for 30 minutes to complete the reaction. The mixture is then evaporated in vacuo to remove most of the solvent, and the residue poured over 100 g. of ice. The resulting solid material is filtered off, dissolved in 50 ml. of methylene chloride and the resulting solution dried over sodium sulfate and the solvent then evaporated in vacuo. The resulting oily residue is crystallized from ethyl acetate to obtain 1-ethyl-4-phenyl-2(1H)-quinazolinone, m.p. 183°–185°C.

EXAMPLE 5

6-Chloro-1-methyl-4-phenyl-2(1H)-quinazolinone

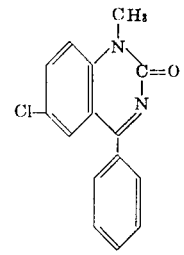

To a solution of 2.56 g. of 6-chloro-4-phenyl-2(1H)-quinazolinone in 100 ml. of dimethylformamide is added, at room temperature, 0.75 g. of sodium hydride (50 percent in mineral oil). The resulting mixture is stirred for 15 minutes at room temperature, and then 4 ml. of methyl iodide is added. The mixture is then stirred at room temperature for an additional 30 minutes, then evaporated in vacuo to remove most of the solvent and then poured over 100 g. of ice. The resulting solid material is filtered off, dissolved in 50 ml. of methylene chloride and the resulting solution dried over sodium sulfate and the solvent then evaporated in vacuo. The resulting oily residue is crystallized from ethyl acetate to obtain 6-chloro-1-methyl-4-phenyl-2(1H)-quinazolinone, m.p. 223°–224°C.

EXAMPLE 6

1-Methyl-4-(p-chlorophenyl)-2(1H)-quinazolinone

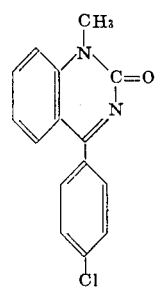

Step A. Preparation of 1-methyl-4-(p-chlorophenyl)-quinazolinium iodide

A solution of 4.5 g. of 4-(p-chlorophenyl)-quinazoline in 55 ml. of methyl iodide is kept at room temperature overnight and then refluxed for 18 hours. The resulting mixture is then cooled, and the crystalline material thus obtained is filtered off and washed with diethyl ether to obtain 1-methyl-4-(p-chlorophenyl)-quinazolinium iodide, m.p. 222°–225°C.

Step B. Preparation of 1-methyl-4-(p-chlorophenyl)-1,2,3,4-tetrahydroquinazoline To a solution of 6.7 g. of 1-methyl-4-(p-chlorophenyl)-quinazolinium iodide in 200 ml. of absolute ethanol and 100 ml. of methylene chloride is added, in small portions and at room temperature, 3.5 g. of sodium borohydride. After 45 minutes 1.5 ml. of acetic acid is added to destroy the excess sodium borohydride. The solvents are then evaporated off in vacuo and the residue treated with 100 ml. of methylene chloride and 5 ml. of aqueous 5N sodium hydroxide solution. The organic phase is then separated, washed with 250 ml. of water, dried over sodium sulfate and then evaporated to obtain 1-methyl-4-(p-chlorophenyl)-1,2,3,4-tetrahydroquinazoline as an oil.

Step C. Preparation of 1-methyl-4-(p-chlorophenyl)-2(1H)-quinazolinone

To a solution of 0.5 g. of 1-methyl-4-(p-chlorophenyl)-1,2,3,4-tetrahydroquinazoline in 20 ml. of purified dioxane is slowly added a solution of 0.625 g. of potassium permanganate in 12 ml. of water. After the addition is completed, the reaction mixture is kept at room temperature for 10 minutes and then 5 ml. of commercial dioxane is added to destroy the excess permanganate. The resulting mixture is then filtered, and the filtrate concentrated to about 10 ml. in vacuo. The resulting product is poured over ice-water, the resulting mixture filtered and the residue washed with water to obtain 1-methyl-4-(p-chlorophenyl)-2(1H)-quinazolinone, m.p. 195°C.

The 4-(p-chlorophenyl)-quinazoline employed in Step A is prepared in the following manner:

An ethereal solution of p-chlorophenyl lithium is prepared by reacting 0.96 g. of p-bromochlorobenzene in 10 ml. of absolute diethyl ether with 3.1 ml. of a 1.6 molar solution of n-butyl lithium in hexane, at room temperature for 30 minutes. To this solution is added a solution of 0.65 g. of quinazoline in 10 ml. of absolute diethyl ether and the resulting mixture stirred for 10 minutes. The resulting lithium salt is decomposed by shaking the reaction mixture with 10 ml. of water. The organic phase is then separated, dried over anhydrous sodium sulfate, filtered and the filtrate evaporated in vacuo. The residue is crystallized from ethyl acetate to obtain 4-(p-chlorophenyl)-3,4-dihydroquinazoline, m.p. 166°–167°C.

To a solution of 5.0 g. of 4-(p-chlorophenyl)-3,4-dihydroquinazoline in 200 ml. of dry dioxane is added, portionwise at room temperature, 60 ml. of aqueous potassium permanganate solution (5.27 g. of potassium permanganate in 100 ml. of water). The excess permanganate is then destroyed by the dropwise addition of formic acid until the solution is colorless. The precipitated inorganic material is then filtered off and the filtrate evaporated in vacuo. The residue is treated with 100 ml. of a 1:1 mixture of methylene chloride and water, the organic phase separated, dried over anhydrous sodium sulfate, filtered and the filtrate evaporated in vacuo. The residue is crystallized from diethyl ether to obtain 4-(p-chlorophenyl)-quinazoline, m.p. 122°–123°C.

EXAMPLE 7

Following the procedure of Step A of Example 6 and employing an equivalent amount of the quinazolines enumerated below in place of the 4-(p-chlorophenyl)-quinazoline used therein there are obtained the products set forth below:

| Quinazoline | Product |
|---|---|
| (1) 4-(p-methoxyphenyl)quinazoline | (1) 1-methyl-4-(p-methoxyphenyl)-quinazolinium iodide, m.p. 228°–232°C. (after recrystallization from ethanol). |
| (2) 4-(2,6-dimethoxyphenyl)-quinazoline | (2) 1-methyl-4-(2,6-dimethoxyphenyl)-quinazolinium iodide, m.p. 198°–202°C. (dec.) (after recrystallization from ethyl acetate). |
| (3) 4-(m-chlorophenyl)-quinazoline | (3) 1-methyl-4-(m-chlorophenyl)-quinazolinium iodide, m.p. 200°–210°C. |
| (4) 4-(m-trifluoromethylephenyl-quinazoline | (4) 1-methyl-4-(m-trifluoromethylphenyl)-quinazolinium iodide. |
| (5) 4-(2,3-dimethylphenyl)-quinazoline | (5) 1-methyl-4-(2,3-dimethylphenyl)-quinazolinium iodide, m.p. 208°–210°C. |

Following the procedure of Step B of Example 6 and employing, in order, an equivalent amount of the products enumerated above in place of the 1-methyl-4-(p-chlorophenyl)-quinazolinium iodide used in Step B of Example 6 there are obtained the tetrahydroquinazolines set forth below:

1. 1-methyl-4-(p-methoxyphenyl)-1,2,3,4-tetrahydroquinazoline (oil).
2. 1-methyl-4-(2,6-dimethoxyphenyl)-1,2,3,4-tetrahydroquinazoline, m.p. 157° C. (after crystallization from ethyl acetate).
3. 1-methyl-4-(m-chlorophenyl)-1,2,3,4-tetrahydroquinazoline (oil).
4. 1-methyl-4-(m-trifluoromethylphenyl)-1,2,3,4-tetrahydroquinazoline (oil).
5. 1-methyl-4-(2,3-dimethylphenyl)-1,2,3,4-tetrahydroquinazoline (oil).

Following the procedure of Step C of Example 6 and employing, in order, an equivalent amount of the tetrahydroquinazolines enumerated above in place of the 1-methyl-4-(p-chlorophenyl)-1,2,3,4-tetrahydroquinazoline used in Step C of Example 6 there are obtained the quinazolinones set forth below:

1. 1-methyl-4-(p-methoxyphenyl)-2(1H)-quinazolinone, m.p. 184° C. (after recrystallization from ethyl acetate).
2. 1-methyl-4-(2,6-dimethoxyphenyl)-2(1H)-quinazolinone, m.p. 166°–167° C. (after recrystallization from ethyl acetate).
3. 1-methyl-4-(m-chlorophenyl)-2(1H)-quinazolinone, m.p. 95°–96° C. (after purification by precipitation of the hydrochloride salt from acetone and subsequent liberation of the free base and crystallization thereof from diethyl ether-petroleum ether (1:1)).
4. 1-methyl-4-(m-trifluoromethylphenyl)-2(1H)-quinazolinone, m.p. 165°–167° C. (after recrystallization from ethyl acetate-diethyl ether (1:1)).
5. 1-methyl -4-(2,3-dimethylphenyl)-2(1H)-quinazolinone, m.p. 186°–188° C. (after recrystallization from ethyl acetate).

EXAMPLE 8

Following the procedure of Example 5 and employing an equivalent amount of 4-phenyl-2(1H)-quinazolinone in place of 6-chloro-4-phenyl-2(1H)-quinazolinone and the halide reactant enumerated below in place of methyl iodide there are obtained the products set forth below:

| Halide Reactant | Product |
| --- | --- |
| (1) n-propyl iodide | 1-n-propyl-4-phenyl-2(1H)-quinazolinone, m.p. 131°C. |
| (2) n-butyl bromide | 1-n-butyl-4-phenyl-2(1H)-quinazolinone, m.p. 103°–104 °C. (after crystallization from ethyl acetate-diethyl ether (1:1)). |
| (3) n-amyl bromide | 1-n-amyl-4-phenyl-2(1H)-quinazolinone, m.p. 121°–122 °C. |
| (4) allyl iodide | 1-allyl-4-phenyl-2(1H)-quinazolinone, m.p. 159°–160 °C. |
| (5) propargyl iodide | 1-propargyl-4-phenyl-2(1H)-quinazolinone, m.p. 181°C. (after crystallization from ethanol). |

EXAMPLE 9

6-Chloro-1-methyl-4-(o-chlorophenyl)-2(1H)-quinazolinone

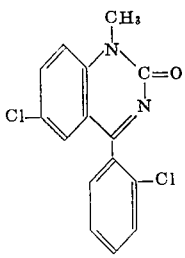

Following the procedure of Example 5 and employing an equivalent amount of 6-chloro-4-(o-chlorophenyl)-2(1H)-quinazolinone, dimethylacetamide and sodium methoxide in place of 6-chloro-4-phenyl-2(1H)-quinazolinone, dimethylformamide and sodium hydride, respectively, there is obtained 6-chloro-1-methyl-4-(o-chlorophenyl)-2(1H)-quinazolinone, m.p. 191°–194°C.

EXAMPLE 10

1-Methyl-4-(p-hydroxyphenyl)-2(1H)-quinazolinone

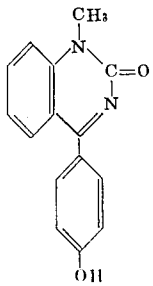

A mixture of 3 g. of 4-(p-methoxyphenyl)-1-methyl-2(1H)-quinazolinone and 20 ml. of 48 percent aqueous hydrobromic acid is refluxed for 20 hours, concentrated in vacuo and then made alkaline (pH 9) with 2N aqueous ammonium hydroxide solution. The basic mixture is then extracted three times with 30 ml. (each) of ethyl acetate. The combined ethyl acetate extracts are then dried over anhydrous sodium sulfate and then evaporated in vacuo and the residue crystallized from ethyl acetate to obtain 1-methyl-4-p-hydroxyphenyl)-2(1H)-quinazolinone, m.p. 291°–293°C.

EXAMPLE 11

1-Isopropyl-4-phenyl-2(1H)-quinazolinone

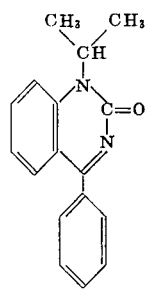

A mixture of 21 g. of crude o-isopropylaminobenzophenone, 40 g. of urethane and 1.5 g. of zinc chloride is heated for 4 hours at 180°–200 °C. (oil bath). The resulting mixture is cooled to room temperature and then there is added thereto 200 ml. of methylene chloride The resulting mixture is filtered and the filtrate extracted twice with 100 ml. (each) of water. The organic phase is dried over anhydrous sodium sulfate and evaporated in vacuo. The residue is crystallized from ethyl acetate to obtain 1-isopropyl-4-phenyl-2(1H)-quinazolinone, m.p. 140°C.

EXAMPLE 12

1-Isobutyl-4-phenyl-2(1H)-quinazolinone

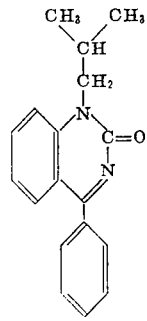

A mixture of 21 g. of crude o-isobutylaminobenzophenone, 40 g. of urethane and 1.5 g. of zinc chloride is heated for 4 hours at 180°–200°C. (oil bath). The resulting mixture is cooled to room temperature and then there is added thereto 200 ml. of methylene chloride. The resulting mixture is filtered and the filtrate extracted twice with 100 ml. (each) of water. The organic phase is dried over anhydrous sodium sulfate and evaporated in vacuo. The residue is crystallized from ethyl acetate-diethyl ether (1:1) to obtain 1-isobutyl-4-phenyl-2(1H)-quinazolinone, m.p. 120°–122°C.

EXAMPLE 13

1-Methallyl-4-phenyl-2(1H)-quinazolinone

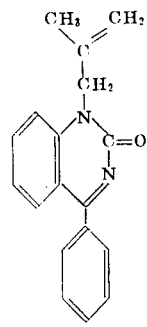

To a warmed solution (40°C.) of 6.7 g. of 4-phenyl-2(1H)-quinazolinone in 150 ml. of dry dimethylacetamide is added 2.25 g. of sodium hydride (50 percent in mineral oil). The resulting mixture is stirred for 30 minutes at 35°–40° C. and then 6 ml. of methallyl chloride is added. The resulting mixture is stirred for 3 hours at 80°–100° C. and then 300 ml. of ice water is added. The resulting mixture is extracted twice with 200 ml. (each) of ethyl acetate. The combined ethyl acetate extracts are dried over anhydrous sodium sulfate, filtered and evaporated in vacuo. The residue is crystallized from 50 ml. of ethyl acetate to obtain 1-methallyl-4-phenyl-2(1H)-quinazolinone, m.p. 142°–143° C.

EXAMPLE 14

6-Chloro-1-isopropyl-4-phenyl-2(1H)-quinazolinone

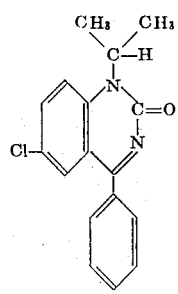

A mixture of 10 g. of 5-chloro-2-isopropylaminobenzophenone, 20 g. of urethane and 1 g. of zinc chloride is heated for 2 hours at 180°–200° C. (oil bath). The resulting mixture is cooled to room temperature and then there is added thereto 200 ml. of methylene chloride. The resulting mixture is filtered and the filtrate extracted twice with 100 ml. (each) of water. The organic phase is dried over anhydrous sodium sulfate and evaporated in vacuo. The residue is crystallized from acetone and dried for 48 hours at 45° C. in high vacuum to obtain 6-chloro-1-isopropyl-4-phenyl-2(1H)-quinazolinone, m.p. 149°–150° C.

EXAMPLE 15

6-Chloro-4-(o-chlorophenyl)-1-isopropyl-2(1H)-quinazolinone

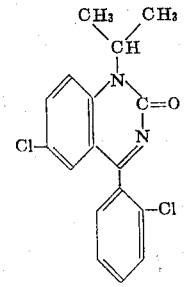

A mixture of 8.2 g. of crude 2', 5-dichloro-2-isopropylaminobenzophenone, 17 g. of urethane and 1.5 g. of zinc chloride is heated for 4 hours at 180°–200° C. (oil bath). The resulting mixture is cooled to room temperature and then there is added thereto 200 ml. of methylene chloride. The resulting mixture is filtered and the filtrate extracted twice with 100 ml. (each) of water. The organic phase is dried over anhydrous sodium sulfate and evaporated in vacuo. The residue is crystallized from diethyl ether-petroleum ether (1:1) to obtain 6-chloro-4-(o-chlorophenyl)-1-isopropyl-2(1H)-quinazolinone, m.p. 147°–149° C.

EXAMPLE 16

6-Chloro-1-ethyl-4-phenyl-2(1H)-quinazolinone

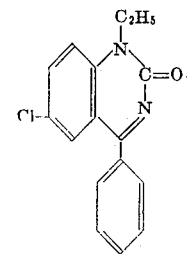

To a hot solution of 5.2 g. of 6-chloro-4-phenyl-2(1H)-quinazolinone in 200 ml. of dimethylformamide is added 1.5 g. of sodium hydride (50 percent in mineral oil). The resulting mixture is stirred for 15 minutes at room temperature and then 10 ml. of ethyl iodide is added. The resulting mixture is stirred for 20 hours at 60° C., then evaporated in vacuo to remove most of the solvent and the residue poured over 100 g. of ice. The resulting solid material is filtered off, dissolved in 50 ml. of methylene chloride and the resulting solution dried over anhydrous sodium sulfate and the solvent then evaporated in vacuo. The residue is crystallized from ethyl acetate to obtain 6-chloro-1-ethyl-4-phenyl-2(1H)-quinazolinone, m.p. 163° C.

EXAMPLE 17

6,7-dimethyl-1-ethyl-4-phenyl-2(1H)-quinazolinone

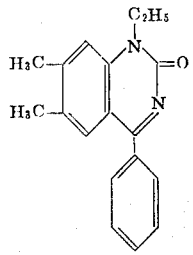

Step A: Preparation of 6,7-dimethyl-4-phenyl-2(1H)-quinazolinone

A mixture of 10 g of 4,5-dimethyl-2-aminobenzophenone, 20 g of urethane and 2 g of zinc chloride is heated for two hours at 180° C to 200° C (oil bath). The resulting mixture is cooled to room temperature and the resulting solid material treated with 100 ml of 1:1 mixture of methylene chloride and water. The organic phase is separated, dried over anhydrous sodium sulphate, filtered and the solvent is evaporated. The residue is crystallized from ethyl acetate to obtain beige crystals of 6,7-dimethyl-4-phenyl-2(1H)-quinazolinone having a mp greater than 280° C.

Step B: Preparation of 6,7-dimethyl-1-ethyl-4-phenyl-2(1H)-quinazolinone

To a solution of 4.5 g. of 4,5-dimethyl-2-aminobezophenone in 100 ml. of diethylacetamide is added, at room temperature, 1.0 g. of sodium hydride (50 percent in mineral oil). The resulting mixture is stirred for 15 minutes at room temperature and then 10 ml. of ethyl iodide is added. The procedure of Example 4 is followed to complete preparation with crystallization from ethanol/diethyl ether (1:1) to obtain 6,7-dimethyl-1-ethyl-4-phenyl-2(1H)-quinazolinone, m.p. 176° C. to 180° C.

EXAMPLE 18

6,7-Dimethyl-1-isopropyl-4-phenyl-2(1H)-quinazolinone

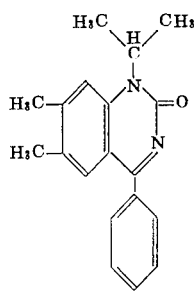

Step A: Preparation of 4,5-dimethyl-2-isopropylaminobenzophenone

A mixture of 9.5 g. of 4,5-dimethyl-2-aminobenzophenone, 10 g. of sodium carbonate and 30 ml. of isopropyl iodide is refluxed for 20 hours, poured onto 200 ml. ice water, and extracted three times each with 100 ml. of ethyl acetate. The organic phase is separated, dried over anhydrous sodium sulphate, filtered, and the filtrate evaporated to dryness in vacuo to obtain 10 g. of reaction mixture as a crude oil. The oil is purified by column chromatography using silica gel with benzene as eluant to obtain a pure yellow oil of 4,5-dimethyl-2-isopropylaminobenzophenone.

Step B: Preparation of 6,7-dimethyl-1-isopropyl-4-phenyl-2(1H)-quinazolinone

Applying equivalent amounts and following the procedure of Example 11, the dried residue is crystallized from diethyl ether to obtain yellow prisms of 6,7-dimethyl-1-isopropyl-4-phenyl-2(1H)-quinazolinone; m.p. 135°C.–137°C.

EXAMPLE 19

4-Phenyl-1,6,7-trimethyl-2(1H)-quinazolinone

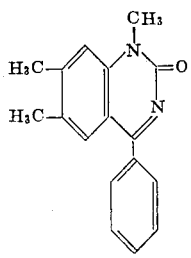

To a solution of 4.5 g. of 6,7-dimethyl-4-phenyl-2(1H) quinazolinone (prepared by Step A of Example 17) in 100 ml. of dimethylformamide is added, at room temperature, 0.75 g. of sodium hydride (50 percent) in mineral oil). The resulting mixture is stirred for 15 minutes at room temperature, and then 4 ml. of methyl iodide is added. The mixture is stirred at room temperature for an additional 30 minutes, then evaporated in vacuo to remove most of the solvent and then poured over 100 g. of ice. The resulting solid material is filtered off, dissolved in 50 ml. of methyl chloride and the resulting solution dried over sodium sulphate and the solvent then evaporated in vacuo. The resulting residue is crystallized from diethyl ether to obtain white crystals or 4-phenyl-1,6,7-trimethyl-2-(1H)-quinazolinone, m.p. 204°–206°C.

EXAMPLE 20

1-isopropyl-4-(p-tolyl)-2(1H)-quinazolinone

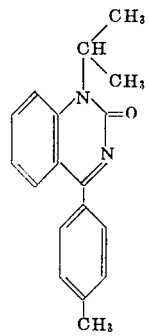

Step A: Preparation of 2-isopropylamino-4′-methylbenzophenone

A mixture of 9.5 g of 2-amino-4′-methylbenzophenone, 10 g of sodium carbonate and 30 ml of isopropyl iodide is refluxed for five days, poured onto 200 ml ice water, and extracted three times with 100 ml ethyl acetate. The organic phase is separated, dried over anhydrous sodium sulphate, filtered and evaporated to dryness in vacuo to obtain 10 g of reaction mixture as a crude oil which is purified by column chromatography using silica gel with benzene as eluant to obtain a pure yellow oil of 2isopropylamino-4′-methyl-benzophenone.

Step B: Preparation of 1-isopropyl-4-(p-tolyl)-2(1H)-quinazolinone

A mixture of 21 g. of 2isopropylamino-4′-methyl-benzophenone 40 g. of urethane and 1.5 g. of zinc chloride is heated for 4 hours at 180°–200° C. (oil bath). The resulting mixture is cooled to room temperature and there is added thereto 200 ml. of methylene chloride. Completing the procedure as in Example 11, there is crystallized from dimethyl ether yellow prisms of the 1-isopropyl-4-(p-tolyl)-2(1H)-quinazolinone, m.p. 138° C. to 140° C.

EXAMPLE 21

6,7-Dimethyl-4-phenyl-1-propargyl-2(1H)-quinazolinone

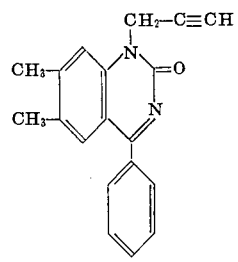

Following the procedure of Example 5, an equivalent amount of 6,7-dimethyl-4-phenyl-2(1H)-quinazolinone in 100 ml. of dimethylformamide is added, at room temperature, an equivalent amount of sodium hydride (50 percent in mineral oil). The resulting mixture is stirred for 15 minutes at room temperature and then an equivalent amount of propargyl bromide is added. Completing the procedure as in Example 5, the resulting oil residue is crystallized from diethyl ether to obtain white crystals of 6,7-dimethyl-4-phenyl-1-propargyl-2(1H)-quinazolinone; m.p. 202°–205° C.

EXAMPLE 22

1-Ethyl-4-phenyl-6-trifluoromethyl-2(1H)-quinazolinone

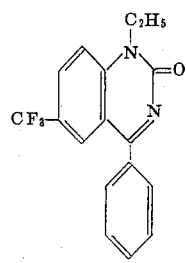

Step A: Preparation of 5-trifluoromethyl-2-ethylaminobenzophenone

A mixture of 10 g. of 5-trifluoromethyl-2-chlorobenzophenone, 500 mg. of powdered copper, 500 ml. of cuprous chloride and 100 ml. liquid ethylamine is heated in a sealed steel cylinder for 2 hours at 130° C.–140° C. The reaction mixture is taken up in 200 ml. of ethyl acetate, extracted twice with water. The organic phase is separated, dried over anhydrous sodium sulphate, filtered and evaporated to dryness in vacuo. The resulting residue is heated in 20 ml. of dioxane and 30 ml. of 6 N hydrochloric acid. The resulting solution is made alkaline with sodium hydroxide and is extracted twice with 100 ml. of ethyl acetate. The organic phases are combined, dried over anhydrous sodium sulphate and evaporated to dryness in vacuo. The thus-obtained residue is crystallized from ethanol to yield yellow prisms of 5-trifluoromethyl-2-ethylaminobenzophenone; m.p. 78° C. – 80° C.

Step B: Preparation of 1-ethyl-4-phenyl-6-trifluoromethyl-2(1H)-quinazolinone

Proceeding as in Example 3, above, a mixture of an equivalent amount of 5-trifluoromethyl-2-ethylaminobenzophenone, 2 g. of urethane and 20 mg. of zinc chloride is heated for 20 hours at temperatures of 140° C.–150° C. (oil bath). Completing the procedure as in Example 3, the residue is crystallized from diethyl ether to give yellow prisms of the 1-ethyl-4-phenyl-6-trifluoromethyl-2(1H)-quinazolinone, which sublimes at 180° C.

EXAMPLE 23

1-Ethyl-6-nitro-4-phenyl-2(1H)-quinazolinone

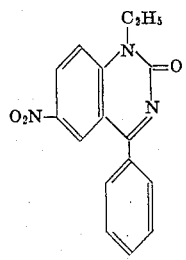

Step A: Preparation of 5-nitro-2-ethylaminobenzophenone

A mixture of 15 g. of 5-nitro-2-chlorobenzophenone, 700 mg. of powdered copper, 700 mg. of cuprous chloride, 15 ml. of ethanol and 15 ml of liquid ethylamine is refluxed for 7 hours to obtain a crystalline material which is filtered off, dissolved in 200 ml. of methylene chloride, treated with charcoal, and filtered. The filtrate is evaporated to dryness in vacuo, and the residue crystallized from ethanol to give yellow prims of 5-nitro-2-ethylaminobenzophenone; m.p. 132°–133° C.

Step B: Preparation of 1-ethyl-6-nitro-4-phenyl-2(1H)-quinazolinone

Proceeding as in Example 11, above, an equivalent amount of 5-nitro-2-ethylaminobenzophenone, 40 g. of urethane and 1.5 g. of zinc chloride is heated for 4 hours at 180°–200° C. (oil bath). Completing the procedure as in Example 11, the residue from the organic phase is crystallized from methanol to give yellow prisms of the 1-ethyl-6-nitro-4-phenyl-2(1H)-quinazolinone, m.p. 214°–215° C.

EXAMPLE 24

6-Nitro-1-isopropyl-4-phenyl-2(1H)-quinazolinone

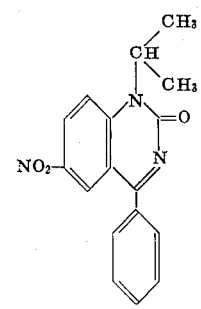

Step A: Preparation of 5-nitro-2-isopropylaminobenzophenone

A mixture of 15 g. of 5-nitro-2-chlorobenzophenone, 700 mg. of powdered copper, 700 mg. of cuprous chloride, 15 ml. of ethanol, and 15 ml. of liquid isopropylamine is refluxed for 20 hours. Completing the procedure as in Example 23 (Step A), above, the residue is crystallized from ethanol to give yellow prisms of 5-nitro-2-isopropylaminobenzophenone; m.p. 155° C.

Step B: Preparation of 6-nitro-1-isopropyl-4-phenyl-2(1H)-quinazolinone

Following the procedure of Example 23 (Step B), above, and employing equivalent amounts, the residue of the organic phase is crystallized from ethyl acetate to give yellow prisms of 6-nitro-1-isopropyl-4-phenyl-2(1H)-quinazolinone; m.p. 190°–192° C.

EXAMPLE 25

6-Amino-1-isopropyl-4-phenyl-2(1H)-quinazolinone

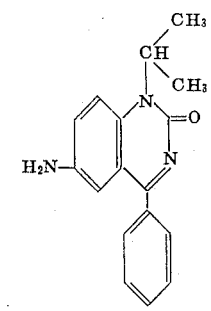

A solution of 12.0 g of 6-nitro-1-isopropyl-4-phenyl-2(1H)-quinazolinone dissolved in 240 ml of hot ethanol is heated to boiling and with stirring there is added 80 ml of water, and then 16 g of iron filings. There is then also added dropwise with stirring a solution made up of 80 ml ethanol, 20 ml water and 4 ml 2N hydrochloric acid over the course of 40 minutes. The resulting mixture is refluxed for 3 hours, and there is then added to the hot solution 4 ml of 2N sodium hydroxide followed by filtering and concentration in vacuo to remove most of the ethanol. There is added to the concentrate 100 ml of ethyl acetate followed by extraction of the organic phase 3 times each with 50 ml of dilute hydrochloric acid. The aqueous phases are combined and made alkaline with sodium hydroxide followed by 2 extractions each with 100 ml of methylene chloride. The organic phases are combined and dried over anhydrous sodium sulfate, filtered and evaporated in vacuo to dryness. The residue is crystallized from ethyl acetate to obtain yellow prisms of 6-amino-1-isopropyl-4-phenyl-2(1H)-quinazolinone; mp 210° – 215°C.

EXAMPLE 26

6-acetamido-1-isopropyl-4-phenyl-2(1H)-quinazolinone

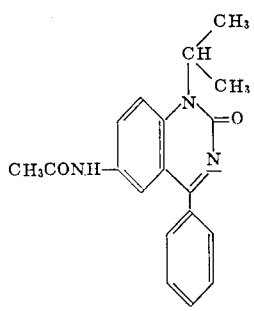

A solution of 2.65 g of 6-amino-1-isopropyl-4-phenyl-2(1H)-quinazolinone prepared as in Example 25, above, dissolved in 25 ml of pyridine and 25 ml of acetic anhydride is heated for 3.5 hours at 70° C. The resulting clear solution is evaporated in vacuo to dryness and the resulting residue crystallized from ethyl acetate to obtain pale yellow prisms of 6-acetamido-1-isopropyl-4-phenyl-2(1H)-quinazolinone; mp 278°–280°C.

EXAMPLE 27

6-Bromo-1-isopropyl-4-phenyl-2(1H)-quinazolinone

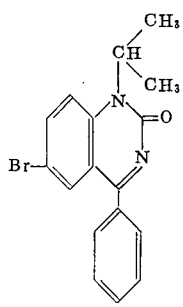

A mixture of 4.2 g of 6-amino-1-isopropyl-4-phenyl-2(1H)-quinazolinone prepared as in Example 25, above, and dilute hydrobromic acid is diazotized at a temperature of 0°–5° C with 15 ml 1N sodium nitrite. The resulting diazonium salt solution is then added dropwise to 300 ml of a hot solution of cuprous bromide prepared in the well-known manner for Sandmeyer-type reactions. The reaction mixture is then heated for 10 minutes at 100° C to form a precipitate which is filtered off and added to 100 ml of methylene chloride and 50 ml of 2N sodium hydroxide. The organic phase is dried over anhydrous sodium sulfate, filtered and evaporated in vacuo to dryness. The residue is purified by column chromatography applying aluminum oxide and methylene chloride as eluant, and then crystallized from ethyl acetate to obtain crystalline prisms of 6-bromo-1-isopropyl-4-phenyl-2(1H)-quinazolinone; mp 142°–143° C.

EXAMPLE 28

6-Cyano-1-isopropyl-4-phenyl-2(1H)-quinazolinone

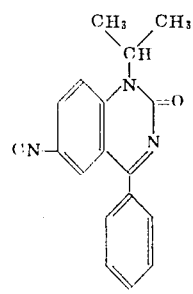

A mixture of 4.2 g. of 6-amino-1-isopropyl-4-phenyl-2(1H)-quinazolinone prepared as in Example 25, above, and dilute hydrochloric acid is diazotized at a temperature of 0°–5° C. with 15 ml. 1N sodium nitrite. The resulting solution is promptly added (within 5 minutes) to a solution of 12 g. of sodium cyanide and 22 g. of cuprous cyanide in 500 ml. of water at room temperature, followed by heating for 45 minutes to a temperature of 90°–100° C. (water bath). The resulting mixture is cooled to room temperature and there is added thereto 200 ml. of chloroform, and the insoluble material filtered out. The organic phase is separated and extracted once with 100 ml. of 1 N hydrochloric acid and once with 50 ml. dilute sodium bicarbonate solution. The organic phase is then dried over anhydrous sodium sulphate, filtered and evaporated in vacuo to dryness. The crude reaction product is then purified as a solution in methylene chloride by filtration through a short column containing alumina. The filtrate is subjected to crystallization employing ethanol/diethyl ether (1:1) to obtain crystalline prisms of 6-cyano-1-isopropyl-4-phenyl-2(1H)-quinazolinone, m.p. 125° C.–128° C.

EXAMPLE 29

1-Ethyl-6-methyl-4-phenyl-2(1H)-quinazolinone

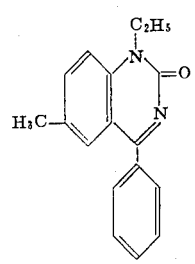

Step A: Preparation of 6-methyl-4-phenyl-2(1H)-quinazolinone

A mixture of 5 g. of 5-methyl-2-aminobenzophenone and 4 g. of urea is heated at a temperature of 180°–200° C. for 2 hours. The solid residue is treated with 100 ml. of 50 percent aqueous solution of ethanol and filtered to obtain the crystalline reaction product at beige crystals of 6-methyl-4-phenyl-2(1H)-quinazolinone, m.p. 280°–281°C.

Step B: Preparation of 1-ethyl-6-methyl-4-phenyl-2(1H)-quinazolinone

Proceeding as in Example 4, above, and employing equivalent amounts with 6-methyl-4-phenyl-2(1H)-quinazolinone replacing the 4-phenyl-2(1H)-quinazolinone of Example 4, there is obtained on crystallization of the residue with diethyl ether yellow needles of 1-ethyl-6-methyl-4-phenyl-2(1H)-quinazolinone, m.p. 180°C.

EXAMPLE 30

1-Isopropyl-6-methyl-4-phenyl-2(1H)-quinazolinone

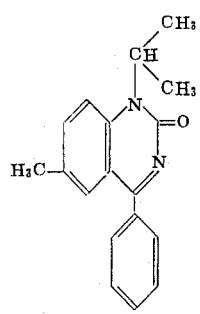

Step A: Preparation of 5-methyl-2-isopropylaminobenzophenone

Proceeding as in Example 18 (Step A) and using equivalent amounts, 5-methyl-2-aminobenzophenone in admixture with sodium carbonate and isopropyl iodide is refluxed for 4 days. Completing the procedure as in Example 18 (Step A), there is obtained a pure yellow oil of 5-methyl-2-isopropylaminobenzophenone.

Step B: Preparation of 1-isopropyl-6-methyl-4-phenyl-2(1H)-quinazolinone

Proceeding as in Example 3, above, and employing equivalent amounts with 5-methyl-2-isopropylaminobenzophenone replacing the o-methylaminobenzophenone of Example 3, the residue of the organic phase is crystallized from ethanol/diethyl ether (1:2) to obtain white prisms of 1-isopropyl-6-methyl-4-phenyl-2(1H)-quinazolinone, m.p. 170°–171° C.

EXAMPLE 31

1-Ethyl-7-chloro-4-phenyl-2(1H)-quinazolinone

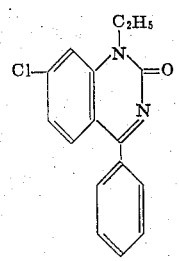

Step A: Preparation of 7-chloro-4-phenyl-2(1H)-quinazolinone

Proceeding as in Example 29 (Step A), above, and employing equivalent amounts, 4-chloro-2-aminobenzophenone is reacted to obtain on filtration of the ethanol solution crystals of 7-chloro-4-phenyl-2(1H)-quinazolinone, m.p. 275°–277° C.

Step B: Preparation of 1-ethyl-7-chloro-4-phenyl-2(1H)-quinazolinone

Proceeding as in Example 16, above, and employing equivalent amounts with 7-chloro-4-phenyl-2(1H)-quinazolinone replacing the 6-chloro-4-phenyl-2(1H)-quinazolinone of Example 16, the residue is crystallized from ethyl acetate to obtain 1-ethyl-7-chloro-4-phenyl-2(1H)-quinazolinone, m.p. 187°–188° C.

EXAMPLE 32

1-allyl-7-chloro-4-phenyl-2(1H)-quinazolinone

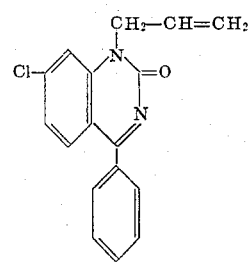

7-Chloro-4-phenyl-2(1H)-quinazolinone prepared as in Example 29 (Step A), is reacted according to the procedure of Example 16 employing equivalent amounts to obtain on crystallization from ethyl acetate 1-allyl-7-chloro-4-phenyl-2(1H)-quinazolinone, m.p. 173° C – 174° C.

EXAMPLE 33

7-Chloro-1-isopropyl-4-phenyl-2(1H)-quinazolinone

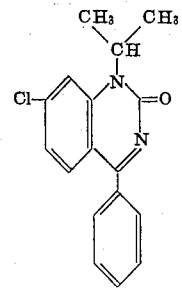

Step A: Preparation of 4-chloro-2-isopropylaminobenzophenone

Employing equivalent amounts and proceeding as in Example 18 (Step A), above, except that reflux is conducted over a period of four days, 4-chloro-2-aminobenzophenone is reacted to obtain from the column chromatography a purified yellow oil 4-chloro-2-isopropylaminobenzophenone.

Step B: Preparation of 7-chloro-1-isopropyl-4-phenyl-2(1H)-quinazolinone

Employing equivalent amounts and proceeding as in Example 11, above, 4-chloro-2-isopropylaminobenzophenone is reacted in place of the o-isopropylaminobenzophenone of Example 11, and the residue of the organic phase is crystallized from ethyl acetate to obtain 7-chloro-1-isopropyl-4-phenyl-2(1H)-quinazolinone, m.p. 165°–168° C.

EXAMPLE 34

6,7-Dimethoxy-1-isopropyl-4-phenyl-2(1H)-quinazolinone

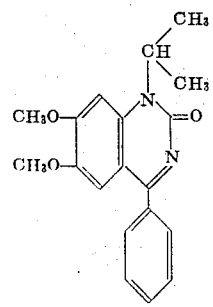

Step A: Preparation of 4,5-dimethoxy-2-isopropylaminobenzophenone

Employing equivalent amounts 4,5-dimethoxy-2-aminobenzophenone is reacted according to the procedure of Example 18 (step A) except that the reflux is conducted for a period of 2 ½ days. The product obtained from the column chromatography is a purified yellow oil of 4,5-dimethoxy-2-isopropylaminobenzophenone.

Step B: Preparation of 6,7-dimethoxy-1-isopropyl-4-phenyl-2(1H)-quinazolinone

Employing equivalent amounts and proceeding as in Example 11, above, 4,5-dimethoxy-2-isopropylaminobenzophenone is reacted in place of the o-isopropylaminobenzophenone of Example 11, and the dried organic phase is purified by column chromatography employing alumina. The residue is crystallized from acetone/petroleum ether (1:1) to obtain white prisms of 6,7-dimethoxy-1-isopropyl-4-phenyl-2(1H)-quinazolinone, m.p. 148°–150° C.

EXAMPLE 35

6-Methylthio-1-ethyl-4-phenyl-2(1H)-quinazolinone

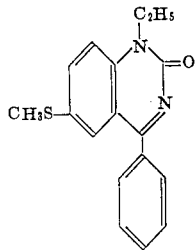

Step A: Preparation of 6-methylthio-4-phenyl-2(1H)-quinazolinone

Proceeding as in Example 29 (Step A), 5-methylmercapto-2-aminobenzophenone is reacted with urea in equivalent amounts to obtain 6-methylthio-4-phenyl-2(1H)-quinazolinone, mp 219° to 221° C.

Step B: Preparation of 6-methylthio-1ethyl-4-phenyl-2(1H)-quinozolinone

Proceeding as in Example 4, above, and employing equivalent amounts, 6-methylthio-4-phenyl-2(1H)-quinazolinone is reacted in place of the 4-phenyl-2(1H)-quinazolinone of Example 4, and the residue is crystallized from ethyl acetate to obtain 6-methylthio-1-ethyl-4-phenyl-2(1H)-quinazolinone, mp 150° to 151° C.

EXAMPLE 36

1-isopropyl-6-methylthio-4-phenyl-2(1H)-quinazolinone

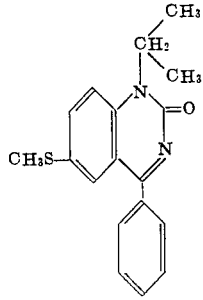

Step A: Preparation of 5-methylthio-2-isopropylaminobenzophenone

Proceeding as in Example 18 (Step A), above, 5-methylthio-2-aminobenzophenone is reacted to obtain after purification a yellow oil of 5-methylthio-2-isopropylaminobenzophenone.

Step B: Preparation of 1-isopropyl-6-methylthio-4-phenyl-2(1H)-quinazolinone

Proceeding as in Example 11, above, and employing equivalent amounts with 5-methylthio-2-isopropylaminobenzophenone replacing the o-isopropylaminobenzophenone of Example 11, there is obtained on crystallization from diethyl ether petroleum ether (1:1) crystals of 1-isopropyl-6-methyl-thio-4-phenyl-2(1H)-quinazolinone, m.p. 93°–95° C.

EXAMPLE 37

1-Isopropyl-7-methyl-4-phenyl-2(1H)-quinazolinone

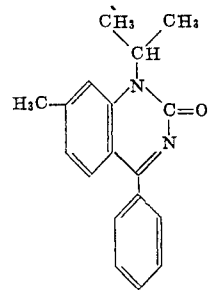

Step A: Preparation of 4-methyl-2-isopropylaminobenzophenone

A mixture of 7 g. of 4-methyl-2-aminobenzophenone, 6.35 g. of sodium carbonate and 18.8 ml. of 2-iodopropane is stirred and refluxed for 3 days. The cooled reaction mixture is then diluted with 200 ml. of benzene and washed twice with water and twice with brine. The organic phase is separated, dried over anhydrous sodium sulfate and concentrated in vacuo to remove substantially all of the benzene. The resulting yellow oil is dissolved in about 10 ml. of methylene chloride and subjected to column chromatography employing alumina (about 400 g.) and methylene chloride as eluant to give a first fraction which on concentration in vacuo to remove methylene chloride produced a yellow oil of 4-methyl-2-isopropylaminobenzophenone.

Step B: Preparation of 1-isopropyl-7-methyl-4-phenyl-2(1H)-quinazolinone

A mixture of 5.9 g. of 4-methyl-2-isopropylaminobenzophenone prepared in Step A above, 13.9 g. of urethane and 500 milligrams of zinc chloride is heated at a temperature of 190° C. for 1-½ hours. There is then additionally added 7 g. of urethane and 250 milligrams of zinc chloride, and the heating continued at a temperature of 190° C. for an additional 2-½ hours. The resulting mixture is cooled to about 100° C. and diluted with chloroform. The resulting mixture is then filtered and the filtrate washed first with water and then with brine. The organic phase is separated, dried over anhydrous sodium sulfate and concentrated in vacuo to remove substantially all of the chloroform and obtain an oily residue which is dissolved in a small amount of about 20 ml. of methylene chloride. The resulting solution is then diluted with about 40 ml. of ethyl acetate and concentrated in vacuo to crystallize 1-isopropyl-7-methyl-4-phenyl-2(1H)-quinazolinone; m.p. 137° to 138° C.

EXAMPLE 38

1-Isopropyl-7-methoxy-4-phenyl-2(1H)-quinazolinone

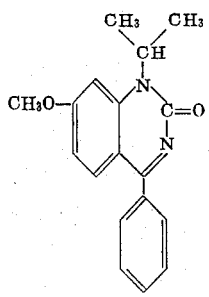

Step A: Preparation of 4-methoxy-2-isopropylaminobenzophenone

A mixture of 9 g. of 2-amino-4-methoxybenzophenone, 15 g. of anhydrous potassium carbonate and 40 ml. of 2-iodopropane is refluxed for 4 days. The cooled reaction mixture is then diluted with 200 ml. of benzene and washed twice with water and twice with brine. The organic phase is separated, dried over anhydrous sodium sulfate and concentrated in vacuo to remove substantially all of the benzene. The resulting oil is dissolved in about 10 ml. of methylene chloride and subjected to column chromatography employing alumina (about 400 g.) and methylene chloride as eluant to give a first fraction which on concentration in vacuo to remove methylene chloride produced an oil of 4-methoxy-2-isopropylaminobenzophenone.

Step B: Preparation of 1-isopropyl-7-methoxy-4-phenyl-2(1H)-quinazolinone

A mixture of 5.9 g. of 4-methoxy-2-isopropylaminobenzophenone, prepared in Step A above, 20 g. of urethane and 1.2 g. of zinc chloride is heated at a temperature of 200°–215° C. for 40 minutes. There is then additionally added about 10 g. of urethane and 600 mg. of zinc chloride and the heating is continued at a temperature of 200°–215° C. for about an additional 1 hour. The resulting mixture is cooled to about 100° C. and diluted with chloroform. The resulting mixture is then filtered and the filtrate washed first with water and then with brine. The organic phase is separated, dried over anhydrous sodium sulfate and concentrated in vacuo to remove substantially all of the chloroform and obtain an oily residue which is dissolved in a small amount of about 10 ml. of methylene chloride. The resulting solution is then diluted with about 40 ml. of ethyl acetate and concentrated in vacuo to crystallize 1-isopropyl-7-methoxy-4-phenyl-2(1H)-quinazolinone; m.p. 133°–137° C.

EXAMPLE 39

7-Hydroxy-1-isopropyl-4-phenyl-2(1H)-quinazolinone

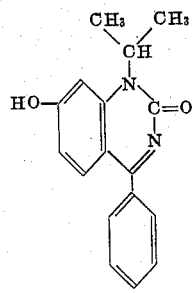

A mixture of 1.0 g. of 1-isopropyl-7-methoxy-4-phenyl-2(1H)-quinazolinone prepared as in Example 38 and 5 ml. of 48 percent hydrobromic acid is refluxed for 20 hours. The resulting mixture is diluted with 100 ml. water, made alkaline (pH ≥ 10) with 2N sodium hydroxide, and extracted twice each with 50 ml. ethyl acetate to remove non-acidic products. The aqueous phase is separated, treated with 2N hydrochloric acid to produce a precipitate which is recovered by filtration. The solid is recrystallized from ethanol to obtain 7-hydroxy-1-isopropyl-4-phenyl-2(1H)-quinazolinone, m.p. 266°–267° C.

EXAMPLE 40

1-Ethyl-6-mercapto-4-phenyl-2(1H)-quinazolinone

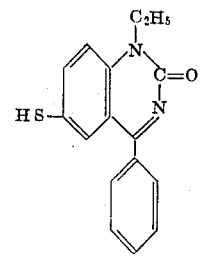

A mixture of 3.0 g. of 6-methylthio-1-ethyl-4-phenyl-2(1H)-quinazolinone prepared as in Example 35 and 25 ml. of 48 percent hydrobromic acid is refluxed for 4 days. The resulting mixture is neutralized with 2N sodium hydroxide and then extracted twice each with 100 ml. of ethyl acetate. The organic phases are combined, dried over anhydrous sodium sulfate, filtered, and evaporated in vacuo. The resulting residue is crystallized from ethyl acetate to obtain 1-ethyl-6-mercapto-4-phenyl-2(1H)-quinazolinone, m.p. 200°–204° C.

EXAMPLE 41

6,8-Dimethyl-1-isopropyl-4-phenyl-2(1H)-quinazolinone

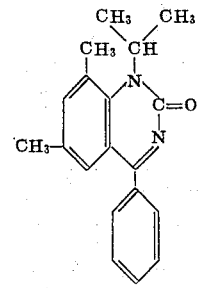

Step A: Preparation of 3,5-dimethyl-2-isopropylaminobenzophenone

A mixture of 14.6 g. of 2-amino-3,5-dimethylbenzophenone (prepared by reactions known from Sternbach et al., J. Org. Chem. 27, 3781 (1962)), 15 g. of anhydrous potassium carbonate and 36 ml. of 2-iodopropane is refluxed for 4 days and then heated for 24 hours in a sealed vessel at a temperature of 160° C. The cooled reaction mixture is then diluted with 200 ml. of benzene and washed twice with water and twice with brine. The organic phase is separated, dried over anhydrous sodium sulfate and concentrated in vacuo to remove substantially all of the benzene. The resulting oil is dissolved in about 10 ml. of methylene chloride and subjected to column chromatography employing alumina (about 400 g.) and methylene chloride as eluant to give a first fraction which on concentration in vacuo to remove methylene chloride produced an oil of 3,5-dimethyl-2isopropylaminobenzophenone.

Step B: Preparation of 6,8-dimethyl-1-isopropyl-4-phenyl-2(1H)-quinazolinone

A mixture of 1 g of 3,5-dimethyl-2-isopropylaminobenzophenone, prepared in Step A above, 4 g of urethane and 50 mg of zinc chloride is heated at a temperature of 190° – 200° C for 45 minutes. There is then additionally added about 2 g of urethane and 25 mg of zinc chloride and the heating is continued at a temperature of 190° – 200° C for about an additional 1 hour. The resulting mixture is cooled to about 100° C and diluted with chloroform. The resulting mixture is then filtered and the filtrate washed first with water and then with brine. The organic phase is separated, dried over anhydrous sodium sulfate and concentrated in vacuo to remove substantially all of the chloroform and obtain an oily residue which is dissolved in a small amount of about 10 ml of methylene chloride. The resulting solution is then diluted with about 40 ml of ethyl acetate and concentrated in vacuo to crystallize 6,8-dimethyl-1-isopropyl-4-phenyl-2(1H)-quinazolinone; mp 168° – 169° C.

EXAMPLE 42

5,7-Dimethyl-1-isopropyl-4-phenyl-2(1H)-quinazolinone

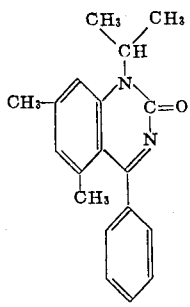

Step A: Preparation of 4,6-dimethyl-2-isopropylaminobenzophenone

A mixture of 5 g. of 2-amino-4,6-dimethylbenzophenone (prepared by reactions known from E. Ritchie, J. Proc. Roy. Soc. N.S. Wales 80, 33 (1946) and Chem. Abstracts 41, 3094(c) (1947)), 5 g. of anhydrous potassium carbonate and 20 ml. of 2-iodopropane is refluxed for 30 hours. The cooled reaction mixture is then diluted with 200 ml. of benzene and washed twice with water and twice with brine. The organic phase is separated, dried over anhydrous sodium sulfate and concentrated in vacuo to remove substantially all of the benzene. The resulting oil is dissolved in about 10 ml. of methylene chloride. The resulting solution is diluted with pentane and concentrated in vacuo to crystallize 4,6-dimethyl-2-isopropylaminobenzophenone; m.p. 87°–88° C.

Step B: Preparation of 5,7-dimethyl-1-isopropyl-4-phenyl-2(1H)-quinazolinone

A mixture of 6.1 g of 4,6-dimethyl-2-isopropylaminobenzophenone, prepared in Step A above, 15 g of urethane and 1 g of zinc chloride is heated at a temperature of 200° – 210° C for one hour. There is then additionally added about 8 g of urethane and 500 mg of zinc chloride and the heating is continued at a temperature of 200° – 210° C for about an additional one hour. The resulting mixture is cooled to about 100° C and diluted with chloroform. The resulting mixture is then filtered and the filtrate washed first with water and then with brine. The organic phase is separated, dried over anhydrous sodium sulfate and concentrated in vacuo to remove substantially all of the chloroform and obtain an oily residue which is dissolved in a small amount of about 10 ml of methylene chloride. The resulting solution is then diluted with about 40 ml of ethyl acetate and concentrated in vacuo to crystallize 5,7-dimethyl-1-isopropyl-4-phenyl-2(1H)-quinazolinone; mp 145° – 147° C.

EXAMPLE 43

7-Chloro-1-isopropyl-6-methyl-4-phenyl-2(1H)-quinazolinone

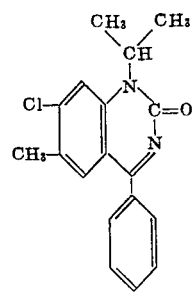

Step A: Preparation of 2-amino-4-chloro-5-methylbenzophenone

To 142 g. of benzoyl chloride is added a total of 57 g. of 3-chloro-4-methylaniline in small portions over a period of ½ hour at temperature of 110° C. The resulting mixture is heated to a temperature of 180° C. and 140 g. of zinc chloride added in divided portions over 1 hour and heating then continued at temperature of 225°–230° C. for 1 ½ hours. The resulting mixture is cooled to temperature of 120°–130° C. and there is added a mixture of 150 ml. of acetic acid, 100 ml. of water and 150 ml. of concentrated sulfuric acid. The resulting mixture is then refluxed for 3 hours, poured onto 2 liters of ice and water and extracted 3 times each with 300 ml of methylene chloride. The organic layers are combined, dried over anhydrous sodium sulfate, filtered and concentrated in vacuo. The resulting oily residue is distributed between a liquid system composed of 500 ml. of 2N sodium hydroxide and 300 ml. of methylene chloride and the organic phase washed with water, then with brine, dried, filtered and evaporated in vacuo to obtain a crude material which is purified by crystallization from diethyl ether/pentane (1:2) to obtain 2-amino-4-chloro-5-methylenebenzophenone, m.p. 95°–96° C.

Step B: Preparation of 4-chloro-2-isopropylamino-5-methylbenzophenone

A mixture of 22 g. of 2-amino-4-chloro-5-methylbenzophenone obtained from Step A, above, 20 g. of sodium carbonate and 60 ml. of 2-iodopropane is refluxed for 120 hours. The cooled reaction mixture is then diluted with 300 ml. of methylene chloride and extracted twice each with 100 ml. of water. The organic phase is separated, dried over anhydrous sodium sulfate, filtered and evaporated in vacuo to remove solvent. The resulting oil is dissolved in a small amount of methylene chloride and subjected to column chromatography employing alumina and methylene chloride as eluant to give a first fraction which on concentration in vacuo to remove methylene chloride produced an orange oil of 4-chloro-2-isopropylamino-5-methylbenzophenone.

Step C: Preparation of 7-chloro-1-isopropyl-6-methyl-4-phenyl-2(1H)-quinazolinone Proceeding as in Step B of Example 37, above, and employing equivalent amounts with 4-chloro-2-isopropylamino-5-methylbenzophenone replacing the 4-methyl-2-isopropylaminobenzophenone of Example 37, there is obtained on crystallization from methylene chloride/diethyl ether (about 1:10) crystals of 7-chloro-1-isopropyl-6-methyl-4-phenyl-2(1H)-quinazolinone, m.p. 190°–191° C.

EXAMPLE 44

7-Chloro-1-ethyl-6-methyl-4-phenyl-2(1H)-quinazolinone

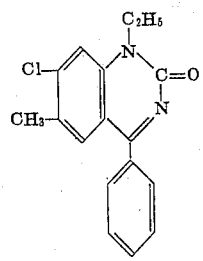

Step A: Preparation of 7-chloro-6-methyl-4-phenyl-2(1H)-quinazolinone

A mixture of 10 g. of 2-amino-4-chloro-5-methylbenzophenone prepared as in Step A of Example 43 and 10 g. of urea is heated at a temperature of about 180°–200° C. for 3 ½ hours. The solid residue is crystallized from dimethylsulfamide/water (1:1) to obtain crystals of 7-chloro-6-methyl-4-phenyl-2(1H)-quinazolinone, m.p. 310°–315° C.

Step B: Preparation of 7-chloro-1-ethyl-6-methyl-4-phenyl-2(1H)-quinazolinone

To a solution of 7 g. of 7-chloro-6-methyl-4-phenyl-2(1H)-quinazolinone in 200 ml. of dimethylsulfamide is added, at room temperature, 1.4 g. of sodium hydride (50 percent in mineral oil). The resulting mixture is stirred for 30 minutes at room temperature and then 20 ml. of ethyl iodide is added and the mixture is stirred for 20 hours at room temperature. The mixture is then poured on 1 liter of ice water to obtain a precipitate which is filtered off, dried and recrystallized from methylene chloride/ether (1:5) to obtain 7-chloro-1-ethyl-6-methyl-4-phenyl-2(1H)-quinazolinone; m.p. 185°–187° C.

EXAMPLE 45

1-Isopropyl-5-methyl-4-phenyl-2(1H)-quinazolinone

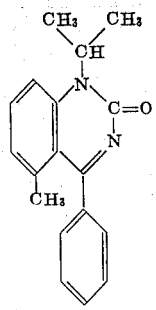

Step A: Preparation of 2-isopropylamino-6-methylbenzophenone

A mixture of 1.4 g of 2-amino-6-methylbenzophenone, 2g of anhydrous potassium carbonate and 20 ml of 2-iodopropane is refluxed for 130 hours. The cooled reaction mixture is then diluted with 200 ml of benzene and washed twice with water and twice with brine. The organic phase is separated, dried over anhydrous sodium sulfate and concentrated in vacuo to remove substantially all of the benzene. The resulting oil is dissolved in about 10 ml of methylene chloride and subjected to column chromatography employing alumina (about 50 g) and methylene chloride as eluant to give a first fraction which on concentration in vacuo to remove methylene chloride produced an oil of 2-isopropylamino-6-methylbenzophenone.

Step B: Preparation of 1-isopropyl-5-methyl-4-phenyl-2(1H)-quinazolinone

A mixture of 1 g of 2-isopropylamino-6-methylbenzophenone, prepared in Step A above, 4 g of urethane and 200 mg of anhydrous zinc chloride is heated at a temperature of 200° – 210° C for 30 minutes. There is then additionally added about 2 g of urethane and 100 mg of zinc chloride and the heating is continued at a temperature of 200° – 210° C for about an additional one hour. The resulting mixture is cooled to about 100° C and diluted with chloroform. The resulting mixture is then filtered and the filtrate washed first with water and then with brine. The organic phase is separated, dried over anhydrous sodium sulfate and concentrated in vacuo to remove substantially all of the chloroform and obtain an oily residue which is dissolved in a small amount of about 10 ml of methylene chloride and subjected to column chromatography employing alumina (about 30 g) and methylene chloride as eluant. The first fraction is then diluted with about 40 ml of ethyl acetate and concentrated in vacuo to crystallize 1-isopropyl-5-methyl-4-phenyl-2(1H)-quinazolinone; mp 153°– 154° C.

EXAMPLE 46

Employing the reactions of Steps A and B of Example 37, above, and the appropriate corresponding starting materials in approximately equivalent amounts, one is able to obtain the compounds of Formula I set forth below:

A.   7-Ethyl-1-isopropyl-4-phenyl-2(1H)-quinazolinone, m.p. 112°–113° C. (crystallization from ethyl acetate).

B.   6,7-Dichloro-1-isopropyl-4-phenyl-2(1H)-quinazolinone, m.p. 167°–168° C. (crystallization from methylene chloride/diethyl ether).

C.   1-Isopropyl-7-methylthio-4-phenyl-2(1H)-quinazolinone, m.p. 135°–137° C. (crystallization from ethyl acetate/pentane (1:1)).

D.   6-Ethyl-1-isopropyl-4-phenyl-2(1H)-quinazolinone, m.p. 116°–117° C. (crystallization from ethyl acetate/diethyl ether (1:5)).

E.   1-Isopropyl-7-methyl-4-(p-tolyl)-2(1H)-quinazolinone, m.p. 156°–157° C. (crystallization from ethyl acetate).

F.   1Isopropyl-7-methyl-4(p-methyoxyphenyl)-2(1H)-quinazolinone, m.p. 163°–165° C. (crystallization from ethyl acetate).

G.   1-Isopropyl-6-methoxy-4-phenyl-2(1H)-quinazolinone, m.p. 140°–143° C. (Crystallization from methylene chloride/diethyl ether (1:2)).

EXAMPLE 47

Employing the reactions of Steps A and B of Example 17, above, and the appropriate corresponding starting materials in approximately equivalent amounts, one is also able to obtain the compounds of Formula I set forth below:

A. 1-Ethyl-7-methyl-4-phenyl-2(1H)-quinazolinone, m.p. 160°–162° C. (crystallization from ethyl acetate).

B. 1-Ethyl-7-nitro-4-phenyl-2(1H)-quinazolinone, m.p. 200°–203° C. (crystallization from ethyl acetate).
C. 1-Ethyl-6,7-dimethoxy-4-phenyl-2(1H)-quinazolinone, m.p. 175° C. (crystallization from diethyl ether).
D. 1-Methyl-7-methyl-4-phenyl-2(1H)-quinazolinone, m.p. 171°–172° C. (crystallization from ethyl acetate).
E. 6,7-Dimethoxy-1-methyl-4-phenyl-2(1H)-quinazolinone, m.p. 197°–198° C. (crystallization from ethyl acetate).

EXAMPLE 48

1-Tert. butyl-6-nitro-4-phenyl-2(1H)-quinazolinone

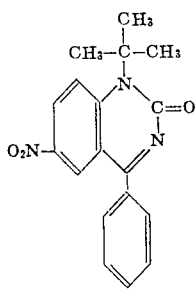

Step A: Preparation of 5-nitro-2-tert. butylaminobenzophenone

To a solution of 20 g. of 2-chloro-5-nitrobenzophenone, 20 ml. of ethanol and 30 ml. of tert. butylamine is added 1.5 g. of copper powder and 1.5 g. of cuprous chloride. The resulting mixture is refluxed for 5 days with stirring, the crystallized product precipitated, filtered and washed with ethanol to obtain yellow crystals of 5-nitro-2-tert. butylaminobenzophenone, m.p. 157°–158° C.

Step B: Preparation of 5-nitro-2-tert. butylaminobenzophenonimine

A mixture of 2 g. of 5-nitro-tert. butylaminobenzophenone, 15 ml. of anhydrous ammonia (low condensed air moisture content), and 20 mg. zinc chloride is heated in a sealed stainless steel cylinder at temperature of 110°–120° C. for 3 days. Excess ammonia is evaporated from the resulting mixture and the residue recrystallized from ethanol to obtain yellow crystals of 5-nitro-2-tert. butylaminobenzophenonimine, m.p. 146° C.

Step C: Preparation of 1-tert. butyl-6-nitro-4-phenyl-2(1H)-quinazolinone

To a solution of 1.3 g. of 5-nitro-2-tert. butylaminobenzophenonimine, and 5 ml. of triethylamine in 30 ml. of benzene is added 25 ml. of a 12 percent solution of phosgene in benzene at temperature between 5° C. to 20° C. The resulting solution is allowed to stand at room temperature for 15 minutes and is then evaporated in vacuo to dryness. The residue is distributed by a liquid system composed of 50 ml. of 0.5 N sodium carbonate and 50 ml. of methylene chloride, followed by an additional extract of the aqueous phase with 30 ml. of methylene chloride. The combined methylene chloride solutions are dried over anhydrous sodium sulfate, evaporated in vacuo to dryness and the residue crystallized from ethyl acetate to obtain light yellow needles of 1-tert. butyl-6-nitro-4-phenyl-2(1H)-quinazolinone, m.p. 206° C.

EXAMPLE 49

1-isopropyl-7-methyl-6-nitro-4-phenyl-2(1H)-quinazolinone

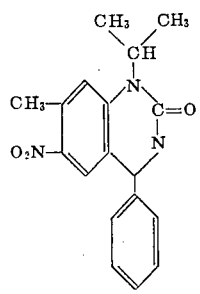

To a cooled solution (0.5° C.) of 13.9 g. of 1-isopropyl-7-methyl-4-phenyl-2(1H)-quinazolinone (prepared as in Example 37) in 50 ml. of concentrated sulfuric acid is added dropwise over 10 minutes a solution of 6.07 g. of potassium nitrate in 15 ml. of concentrated sulfuric acid. The resulting solution is allowed to warm to room temperature and then stirred for 2 hours. The solution is then poured into ice water and the resulting solid is isolated by filtration. The solid is dissolved in 100 ml. of diethyl ether and the solution is washed once with 100 ml. of water before being dried over anhydrous sodium sulfate. The mixture is filtered and the filtrate is evaporated in vacuo to yield a residue which is crystallized from 50 ml. of ethyl acetate to obtain 1-isopropyl-7-methyl-6-nitro-4-phenyl-2(1H)-quinazolinone, m.p. 192°–194° C.

EXAMPLE 50

6-Dimethylamino-1-isopropyl-7-methyl-4-phenyl-2(1H)-quinazolinone

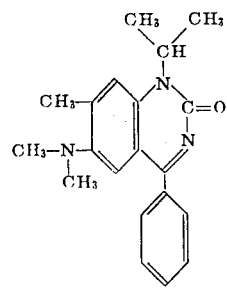

A mixture of 8 g. of 1-isopropyl-7-methyl-6-nitro-4-phenyl-2(1H)-quinazolinone (prepared as in Example 49) and 8 g. of Raney Nickel in 200 ml. of methenol, 100 ml. of dioxane and 20 ml. of a 37 percent solution of formaldehyde in methenol is shaken under hydrogen at room temperature and at an initial pressure of 50 lb/sq. in. The mixture is shaken for a total of 3 hours by which time uptake of hydrogen has ceased. The catalyst is then removed by filtration and the filtrate is concentrated in vacuo. The residue is crystallized from 50 ml. of ethyl acetate to yield 6-dimethylamino-1-isopropyl-7-methyl-4-phenyl-2(1H)-quinazolinone, m.p. 184°–186° C.

EXAMPLE 51

6-Dimethylamino-1-isopropyl-4-phenyl-2(1H)-quinazolinone

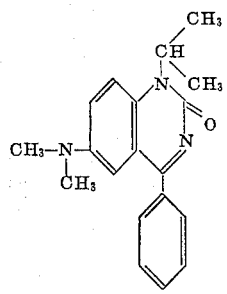

Employing equivalent amounts, 6-nitro-1-isopropyl-4-phenyl-2(1H)-quinazolinone (prepared as in Example 24) is subjected to reaction following the procedure of Example 50, and the residue of the organic phase is crystallized from ethyl acetate to obtain 6-dimethylamino-1-isopropyl-4-phenyl-2(1H)-quinazolinone, m.p. 167°–168° C.

EXAMPLE 52

6-N-ethylamino-1-isopropyl-4-phenyl-2(1H)-quinazolinone.

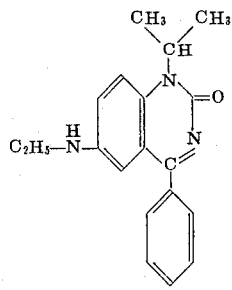

A mixture of 2 g. of 6-amino-1-isopropyl-4-phenyl-2(1H)-quinazolinone and 5 g. of Raney Nickel W2 in 100 ml. of ethanol is stirred and heated under reflux for 2 hours. The hot mixture is then filtered through diatomaceous earth obtained under the trademark "Celite" and the filtrate concentrated in vacuo. The residue so obtained is crystallized from diethyl ether to yield 6-N-ethylamino-1-isopropyl-4-phenyl-2(1H)-quinazolinone, m.p. 224° C.

EXAMPLE 53

6-N-isopropylamino-1-isopropyl-4-phenyl-2(1H)-quinazolinone.

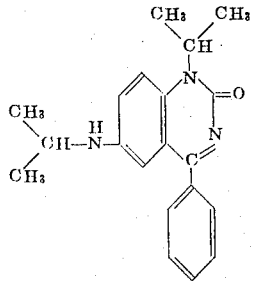

A mixture of 1 g. of 6-amino-1-isopropyl-4-phenyl-2(1H)-quinazolinone and 1 g. of anhydrous sodium carbonate in 10 ml. of isopropyl iodide is stirred and heated under reflux for 4 hours. The resulting mixture is then cooled, diluted with 100 ml. of diethyl ether, filtered and the filtrate is concentrated in vacuo to yield a residue which is crystallized from a mixture of diethyl ether/methylene chloride (5:1) to obtain 6-N-isopropylamino-1-isopropyl-4-phenyl-2(1H)-quinazolinone, m.p. 222° C.

The reaction of Example 4 is repeated except that the reaction is allowed to continue for about 48 hours and the reaction mixture is subjected to conventional hydrogen chloride treatment to obtain on crystallization from acetone/diethyl ether (1:1) crystals of 6-diisopropylamino-1-isopropyl-4-phenyl-2(1H)-quinazolinone hydrochloride, m.p. 225° C. (decomposition).

EXAMPLE 54

7-Dimethylamino-1-isopropyl-4-phenyl-2(1H)-quinazolinone.

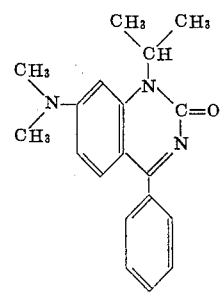

Step A: Preparation of 4-dimethylamino-2-nitrobenzonitrile.

A mixture of 89 g. of 4-chloro-3-nitro-N,N-dimethylaniline and 48 g. of cuprous cyanide in 450 ml. of dimethylacetamide is stirred and heated under reflux for 6 hours. To complete the reaction, a further 24 g. of cuprous cyanide is then added and the mixture is refluxed for 3 hours. The resulting solution is cooled and added slowly to 5 l. of ice water. A solid precipitate is obtained which is isolated by filtration and dried. A mixture of the precipitate in 2 l. of methylene chloride and 200 ml. of methanol is stirred and heated under reflux for 1 hour and then cooled and filtered through "Celite." The filtrate is concentrated in vacuo and the residue is crystallized from 100 ml. of ethanol to yield 4-dimethylamino-2-nitrobenzonitrile, m.p. 182° C.

Step B: Preparation of 4-dimethylamino-2-aminobenzonitrile.

To a refluxing mixture of 30 g. of 4-dimethylamino-2-nitrobenzonitrile in 600 ml. of ethanol, 60 ml. of dioxane and 80 ml. of concentrated hydrochloric acid is added in portions 30 g. of iron powder. When the addition is complete the mixture is refluxed for 1 hour. It is then filtered hot through "Celite" and the filtrate is concentrated in vacuo to one quarter of its volume. The residue is poured into 500 ml. of ice water to which 2N sodium hydroxide solution is then added until it is basic. The aqueous mixture is extracted twice with 200 ml. of methylene chloride. The organic phase is dried over anhydrous sodium sulfate and concentrated in vacuo to give a residue which is crystallized from ethanol to obtain 4-dimethylamino-2-aminobenzonitrile, m.p. 110° C.

Step C: Preparation of 4-dimethylamino-2-isopropylaminobenzonitrile.

A mixture of 10 g. of 4-dimethylamino-2-aminobenzonitrile, 200 mg. of copper powder and 10.4 g. of anhydrous sodium carbonate in 35 ml. of isopropyl iodide is heated under reflux for 30 hours. The mixture is then cooled, diluted with 100 ml. of diethyl ether and filtered. The filtrate is washed with 100 ml. of water and dried over anhydrous sodium sulfate. The solvent is removed in vacuo to yield a crude yellow oil of 4-dimethylamino-2- isopropylaminobenzonitrile. The product is purified with column chromatography using chloroform as eluant.

Step D: Preparation of 4-dimethylamino-2-isopropylaminobenzophenonimine.

A solution of 8.7 g. of 4-dimethylamino-2-isopropylaminobenzonitrile in 150 ml. of absolute diethyl ether is added dropwise to a stirred solution of 125 millimoles of phenyl lithium in 50/50 mixture of diethyl ether and benzene, held at 0°–5° C. Stirring is continued for 1 hour while the mixture is allowed to warm to room temperature. It is then poured onto 500 ml. of ice water and the organic phase is separated. After drying over anhydrous sodium sulfate the solvent is removed in vacuo to yield 4-dimethylamino-2-isopropylaminobenzophenonimine as a crude yellow oil.

Step E: Preparation of 7-dimethylamino-1-isopropyl-4-phenyl-2(1H)-quinazolinone.

To a mixture of 14 g. of crude 4-dimethylamino-2-isopropylaminobenzophenonimine and 20 ml. of triethylamine in 150 ml. of benzene cooled to a temperature of 10° C is added 52 ml. of a 12 percent solution of phosgene in benzene. The resulting mixture is allowed to stand at room temperature for 30 mins. and then gently heated in vacuo to remove excess phosgene. The resulting mixture is washed with 100 ml. of 2N sodium hydroxide solution and the organic phase is separated. It is dried over anhydrous sodium sulfate and evaporated in vacuo to yield a residue that is crystallized from a mixture of diethyl ether/methylene chloride (5:1) to obtain 7-dimethylamino-1-isopropyl-4-phenyl-2(1H)-quinazolinone, m.p. 181°–183° C.

EXAMPLE 55

6-(N-ethyl-N-isopropyl)amino-1-isopropyl-4-phenyl-2(1H)-quinazolinone

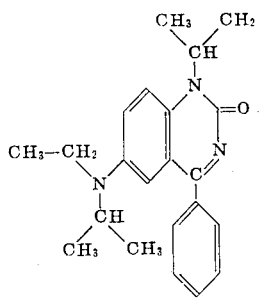

A mixture of 1 g. of 6-N-ethylamino-1-isopropyl-4-phenyl-2(1H)-quinazolinone (prepared as in Example 52) and 1 g. of anhydrous sodium carbonate in 30 ml. of isopropyl iodide is stirred and heated under reflux for 24 hours. It is then cooled and diluted with 100 ml. of ether. After filtration, the filtrate is concentrated in vacuo to yield a residue which is crystallized from a mixture of diethyl ether/methylene chloride (10:1) to obtain 6-(N-ethyl-N-isopropyl)amino-1-isopropyl-4-phenyl-2(1H)-quinazolinone, m.p. 165°.

The word "lower" as used herein in association with such terms as "lower alkyl," "lower alkoxy," and the like shall be taken as indicating an organic substituent of from one to six carbon atoms, inclusive, unless otherwise defined herein.

What is claimed is:

1. A compound of the formula

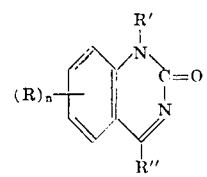

wherein R represents hydrogen; halo; lower alkyl; hydroxy; lower alkoxy; nitro; amino; acetamido; mercapto; cyano; trifluoromethyl; lower alkylthio; N-(lower)alkylamino or di(lower)alkylamino;

n is 1 or 2, and when 2 then: A) one and the other R is, independently, halo, lower alkyl or lower alkoxy, or one R is from the group of halo, lower alkyl and lower alkoxy and the other R is from the group of nitro, amino, N-(lower)alkylamino and di-(lower)alkylamino or B) one R is N-(lower)alkylamino or di-(lower)alkylamino while the other R is nitro;

R' represents lower alkyl, allyl, methallyl or propargyl; provided R' is not an unsaturated hydrocarbon substituent when R is N-alkylamino;

R'' represents phenyl or substituted phenyl of the formula

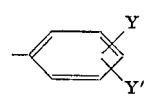

Y represents halo, hydroxy, lower alkyl, lower alkoxy or trifluoromethyl; and

Y' represents hydrogen, halo, hydroxy, lower alkyl or lower alkoxy or a pharmaceutically acceptable acid addition salt thereof.

2. A compound of claim 1 wherein R' represents allyl, methallyl or propargyl and R and R'' are as defined in claim 1.

3. The compound of claim 1 which is 1-methyl-4-phenyl-2(1H)-quinazolinone.

4. The compound of claim 1 which is 1-ethyl-4-phenyl-2(1H)-quinazolinone.

5. The compound of claim 1 which is 6-chloro-1-methyl-4-phenyl-2(1H)-quinazolinone.

6. The compound of claim 1 which is 1-methyl-4-(m-chlorophenyl)-2(1H)-quinazolinone.

7. The compound of claim 1 which is 1-propyl-4-phenyl-2(1H)-quinazolinone.

8. The compound of claim 1 which is 1-butyl-4-phenyl-2(1H)-quinazolinone.

9. The compound of claim 1 which is 1-amyl-4-phenyl-2(1H)-quinazolinone.

10. The compound of claim 1 which is 1-allyl-4-phenyl-2(1H)-quinazolinone.

11. The compound of claim 1 which is 1-propargyl-4-phenyl-2(1H)-quinazolinone.

12. The compound of claim 1 which is 1-isopropyl-4-phenyl-2(1H)-quinazolinone.

13. The compound of claim 1 which is 1-isobutyl-4-phenyl-2(1H)-quinazolinone.

14. The compound of claim 1 which is 6-chloro-1-isopropyl-4-phenyl-2(1H)-quinazolinone.

15. The compound of claim 1 which is 6-chloro-1-ethyl-4-phenyl-2(1H)-quinazolinone.

16. A compound of claim 1 wherein R represents hydrogen, halo, lower alkyl or lower alkoxy, and n, R' and R'' are as defined in claim 1.

17. A compound of claim 16 in which R is hydrogen or halo, and n is 1.

18. The compound of claim 1 which is 6,7-dimethyl-1-isopropyl-4-phenyl-2(1H)-quinazolinone.

19. The compound of claim 1 which is 1-ethyl-6-nitro-4-phenyl-2(1H)-quinazolinone.

20. The compound of claim 1 which is 1-isopropyl-6-nitro-4-phenyl-2(1H)-quinazolinone.

21. The compound of claim 1 which is 6-amino-1-isopropyl-4-phenyl-2(1H)-quinazolinone.

22. The compound of claim 1 which is 6-bromo-1-isopropyl-4-phenyl-2(1H)-quinazolinone.

23. The compound of claim 1 which is 1-ethyl-6-methyl-4-phenyl-2(1H)-quinazolinone.

24. The compound of claim 1 which is 1-isopropyl-6-methyl-4-phenyl-2(1H)-quinazolinone.

25. The compound of claim 1 which is 7-chloro-1-ethyl-4-phenyl-2(1H)-quinazolinone.

26. The compound of claim 1 which is 7-chloro-1-isopropyl-4-phenyl-2(1H)-quinazolinone.

27. A compound of claim 1 in which R'' is phenyl.

28. A compound of claim 1 wherein R' represents methyl, ethyl or isopropyl, and n, R and R'' are as defined in claim 1.

29. A compound of claim 28 in which R'' is phenyl.

30. A compound of claim 28 wherein R' is isopropyl.

31. A compound of claim 30 in which R'' is phenyl.

32. A compound of claim 30 wherein R is 7-methyl.

33. The compound of claim 32 which is 1-isopropyl-7-methyl-4-phenyl-2(1H)-quinazolinone.

34. The compound of claim 32 which is 5,7-dimethyl-1-isopropyl-4-phenyl-2(1H)-quinazolinone.

35. The compound of claim 1 which is 1-isopropyl-7-methoxy-4-phenyl-2(1H)-quinazolinone.

36. The compound of claim 1 which is 7-chloro-1-isopropyl-6-methyl-4-phenyl-2(1H)-quinazolinone.

37. The compound of claim 1 which is 1-isopropyl-5-methyl-4-phenyl-2(1H)-quinazolinone.

38. The compound of claim 1 which is 7-ethyl-1-isopropyl-4-phenyl-2(1H)-quinazolinone.

39. The compound of claim 1 which is 6-ethyl-1-isopropyl-4-phenyl-2(1H)-quinazolinone.

40. The compound of claim 1 which is 1-isopropyl-7-methyl-4-(p-tolyl)-2(1H)-quinazolinone.

41. The compound of claim 1 which is 1-isopropyl-7-methyl-4-(p-methoxyphenyl)-2(1H)-quinazolinone.

42. The compound of claim 1 which is 1-ethyl-7-methyl-4-phenyl-2(1H)-quinazolinone.

43. The compound of claim 1 which is 1-ethyl-7-nitro-4-phenyl-2(1H)-quinazolinone.

44. The compound of claim 1 which is 1-methyl-7-methyl-4-phenyl-2(1H)-quinazolinone.

45. A compound of claim 1 in which R' is tertiary butyl.

46. A compound of claim 45 in which R'' is phenyl.

47. The compound of claim 46 which is 1-tert.-butyl-6-nitro-4-phenyl-2(1H)-quinazolinone.

48. A compound of claim 1 in which R is selected from the group of hydrogen, halo, lower alkyl, lower alkoxy, hydroxy, nitro, amino, acetoamido, mercapto, cyano, trifluoromethyl and lower alkylthio, and R', R'' and n are as defined in claim 1.

49. A compound of claim 1 in which R' is isopropyl.

50. A compound of claim 1 in which R is N-alkylamino or dialkylamino.

51. A compound of claim 50 in which R' is lower alkyl.

52. A compound of claim 50 in which R is N-alkylamino.

53. A compound of claim 50 in which R is dialkylamino.

54. A compound of claim 52 in which R' is isopropyl.

55. A compound of claim 54 in which R is N-alkylamino.

56. A compound of claim 54 in which R is dialkylamino.

57. A compound of claim 55 in which the other R is 7-alkyl of one to three carbon atoms.

58. A compound of claim 56 in which the other R is 7-alkyl of one to three carbon atoms.

59. A compound of claim 58 which is 6-dimethylamino-1-isopropyl-7-methyl-4-phenyl-2(1H)-quinazolinone, or an acid addition salt thereof.

60. A compound of claim 58 which is 6-dimethylamino-1-isopropyl-4-phenyl-2(1H)-quinazolinone, or an acid addition salt thereof.

61. A compound of claim 57 which is 6-N-ethylamino-1-isopropyl-4-phenyl-2(1H)-quinazolinone, or an acid addition salt thereof.

62. A compound of claim 57 which is 6-N-isopropylamino-1-iso-propyl-4-phenyl-2(1H)-quinazolinone, or an acid addition salt thereof.

63. A compound of claim 56 which is 7-dimethylamino-1-isopropyl-4-phenyl-2(1H)-quinazolinone, or an acid addition salt thereof.

64. A compound of the formula:

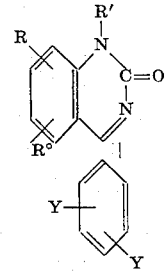

wherein R' is lower alkyl or allyl;
R is hydrogen, halo, lower alkyl, lower alkoxy, trifluoromethyl or lower alkylthio;
R° is hydrogen, halo, lower alkyl or lower alkoxy, and each of Y is hydrogen, halo, lower alkyl or lower alkoxy.

65. A process for preparing a compound of claim 1 wherein R' represents methyl, R is from the group of hydrogen, halo, lower alkyl, lower alkoxy, nitro, acetamido or trifluoromethyl, and n and R'' are as defined in claim 1 with n subject to the limitation recited in claim 1 when n is 2, which comprises treating a quinazoline of the formula

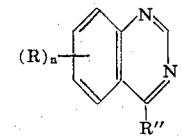

wherein R, R'' and n are as defined above, with a methyl halide at a temperature in the range of from about 20° C. to about 45° C. to form the corresponding 1-methyl-quinazolinium halide, reducing the latter with a borohydride at a temperature in the range of from about 20° C. to 80° C. to form the corresponding 1-methyl-1,2,3,4-tetrahydroquinazoline and oxidizing the latter at about room temperature with sodium permanganate or potassium permanganate.

66. A process of claim 65 wherein the methyl halide is methyl iodide.

67. A process for preparing a compound of claim 1 wherein R' represents methyl, R is from the group of hydrogen, halo, lower alkyl, lower alkoxy, nitro, acetamido or trifluoromethyl, and n and R'' are as defined in claim 1 with n subject to the limitation recited in claim 1 when n is 2, which comprises treating a quinazoline of the formula

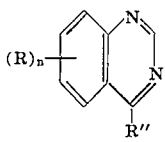

wherein R, R'' and n are as defined above, with a methyl halide at a temperature in the range of from about 20° C. to about 45° C. to form the corresponding 1-methyl-quinazolinium halide and oxidizing the latter at about room temperature with sodium permanganate or potassium permanganate.

68. The process of claim 67 in which R is hydrogen, halo, lower alkyl or lower alkoxy.

69. A process of claim 67 wherein the methyl halide is methyl iodide.

70. A process for preparing a compound of claim 1 wherein R' is methyl and n is 1 and R and R'' are as defined in claim 54 which comprises oxidizing the corresponding 1-methyl-1,2,3,4-tetrahydroquinazoline with sodium permanganate or potassium permanganate.

* * * * *